US011446768B2

(12) United States Patent
Evans et al.

(10) Patent No.: US 11,446,768 B2
(45) Date of Patent: Sep. 20, 2022

(54) LASER WIRE PROCESSING DEVICE

(71) Applicant: THE BOEING COMPANY, Chicago, IL (US)

(72) Inventors: Nick S. Evans, Lynnwood, WA (US); Bradley J. Mitchell, Snohomish, WA (US); Mark Blumenkrantz, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 542 days.

(21) Appl. No.: 16/239,146

(22) Filed: Jan. 3, 2019

(65) Prior Publication Data

US 2019/0151995 A1 May 23, 2019

Related U.S. Application Data

(63) Continuation of application No. 15/199,896, filed on Jun. 30, 2016, now Pat. No. 10,239,159.

(51) Int. Cl.
*B23K 26/364* (2014.01)
*B23K 26/06* (2014.01)
(Continued)

(52) U.S. Cl.
CPC ........ *B23K 26/364* (2015.10); *B23K 26/0604* (2013.01); *B23K 26/0823* (2013.01);
(Continued)

(58) Field of Classification Search
CPC .............. B23K 26/364; B23K 26/1224; B23K 26/0604; B23K 26/0823; B23K 26/123; B23K 26/127; B23K 26/38; B23K 2101/32; B23K 2101/34; B23K 2101/38; B23K 26/103; B23K 26/36; B23K 26/40; B23K 26/03; B23K 37/0235; B23K 26/0846;
(Continued)

(56) References Cited

U.S. PATENT DOCUMENTS 3,953,706 A * 4/1976 Harris ................... B23K 26/103
219/121.68
4,745,828 A * 5/1988 Stepan ................... G02B 6/245
81/9.42
(Continued)

*Primary Examiner* — Joel M Attey
*Assistant Examiner* — Rachel R Rizzo
(74) *Attorney, Agent, or Firm* — Patterson + Sheridan, LLP

(57) ABSTRACT

A wire guide and a laser wire-processing device that includes a wire guide are provided. The laser wire-processing device includes a housing and an aperture in a side of the housing, wherein the aperture defines a longitudinal axis that is substantially perpendicular to the aperture. The laser wire-processing device also includes a backstop arranged in the housing and aligned with the longitudinal axis, the backstop defining a wire-contact surface in a facing relationship with the aperture. The laser wire-processing device also includes a wire guide arranged in the housing to manipulate a wire inserted through the aperture into a desired position relative to the longitudinal axis between the aperture and the backstop. The laser wire-processing device also includes a laser operable to direct a laser beam toward an insulation layer of the wire. The wire guide could be a tube arranged in the device or a backstop guide.

16 Claims, 15 Drawing Sheets

(51) Int. Cl.
| | |
|---|---|
| *B23K 26/08* | (2014.01) |
| *B23K 26/12* | (2014.01) |
| *B23K 26/38* | (2014.01) |
| *B23K 101/32* | (2006.01) |
| *B23K 101/38* | (2006.01) |
| *B23K 101/34* | (2006.01) |

(52) U.S. Cl.
CPC ......... *B23K 26/123* (2013.01); *B23K 26/127* (2013.01); *B23K 26/1224* (2015.10); *B23K 26/38* (2013.01); *B23K 2101/32* (2018.08); *B23K 2101/34* (2018.08); *B23K 2101/38* (2018.08)

(58) Field of Classification Search
CPC .. B23K 26/361; B23K 9/1333; B23K 26/211; B23K 26/1464; B23K 26/106; B23K 26/342; B23K 26/34; B23K 26/32; B23K 26/28; B23K 9/124; B23K 9/133; B23K 9/125; B23K 9/1336; B23K 9/122; B23K 26/351; B23K 26/00; B23K 9/09; B23K 9/173; B23K 9/067; B23K 9/32; B23K 26/02; B23K 9/12; B23K 9/00; B23K 9/28; H02G 1/1297; H02G 1/1256; H02G 1/1265; H02G 1/128; H02G 1/12; H02G 1/1285; H02G 1/1248; H02G 1/126; H02G 1/127; H02G 1/1253; H02G 1/08; B65G 51/02; B65H 54/58; B65H 51/20; B65H 51/16; B65H 51/10; B65H 51/32; B65H 75/248; B65H 75/246; B65H 49/04; B65H 59/225; B65H 54/56; B65H 51/00; B65H 51/18; B65H 51/30; B65H 75/28; B65H 75/24; B65H 57/12; B65H 57/18; B65H 49/08; B65H 49/38; B65H 51/04; B65H 57/26; B65H 65/00; B65H 59/08; H01R 43/28; H01R 39/64; H01R 43/052; H01R 43/05; H01R 43/04; B25J 9/00; H01B 13/012; H01B 13/01245; H01B 13/01227; H01B 13/01236; H01B 13/01209; H01B 13/00; B23H 7/107; B23H 7/10; F22B 37/003; F22B 37/00; A61B 17/1714; A61B 17/0483; A61B 17/1637; A61B 17/8869; A61B 17/0482; A61B 17/7053; A61B 17/842; A61B 17/1675; A61B 17/0487; A61B 17/1671; A61B 17/683; A61B 17/0218; A61B 17/0401; A61B 17/0469; A61B 17/8863; A61B 17/16; A61B 17/17; A61B 17/04; A61B 17/02; A61B 17/68; A61B 17/88; A61F 2/0805; A61F 2/08; A61F 2/00; F16C 1/10; F16C 1/06; F16C 1/26; F16C 1/20; C23G 3/02; B21F 23/00; B21F 1/026; G02B 6/4485; G02B 6/44; B29C 35/065; B29C 64/118; B29C 35/04; B29C 35/06; B29C 64/106; B29C 64/112; B23P 23/00; B23P 19/00; B21C 47/30; B21C 47/32

See application file for complete search history.

(56) References Cited

U.S. PATENT DOCUMENTS

| | | | | |
|---|---|---|---|---|
| 4,993,287 A | * | 2/1991 | Carpenter | ............ G02B 6/4497 81/9.51 |
| 5,837,961 A | * | 11/1998 | Miller | .................... H02G 1/128 219/121.68 |
| 2013/0248501 A1 | * | 9/2013 | Anderson | ............ B23K 26/103 219/121.69 |

* cited by examiner

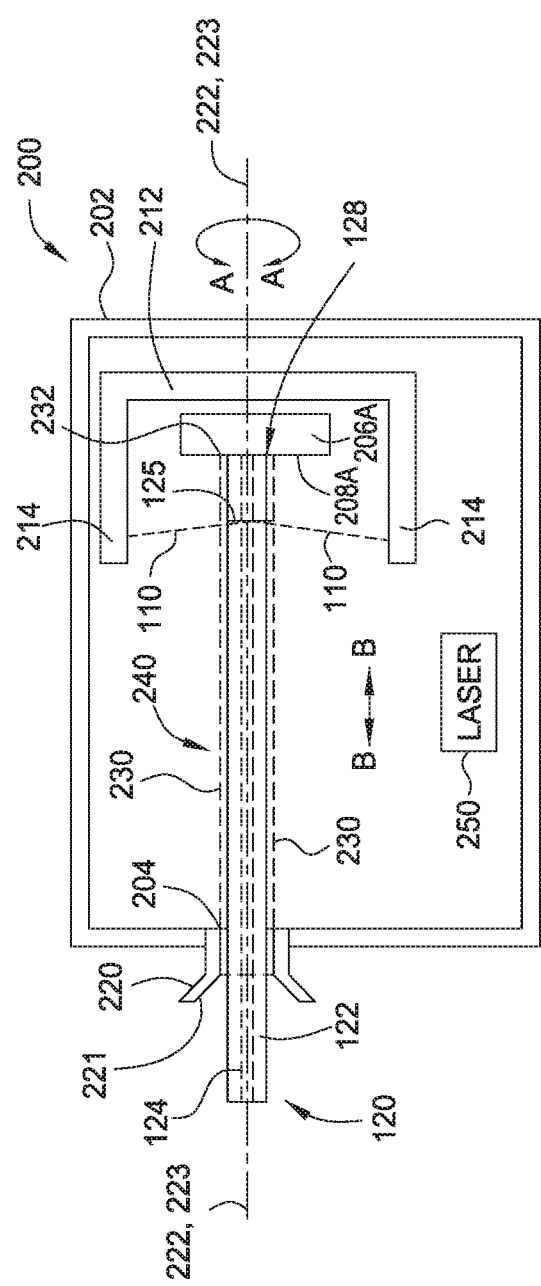

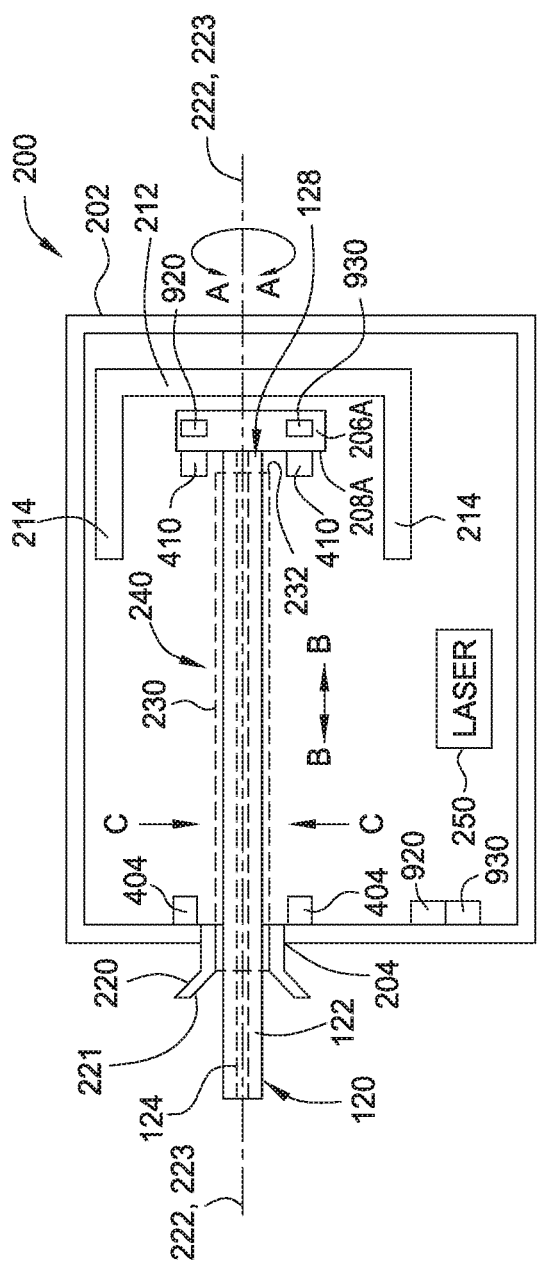
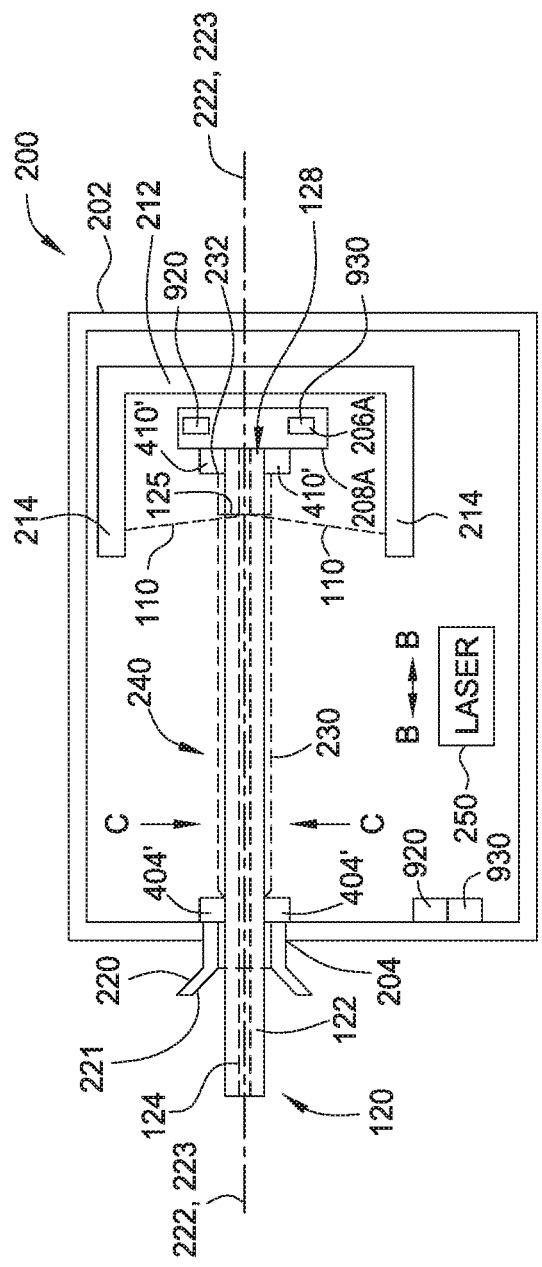

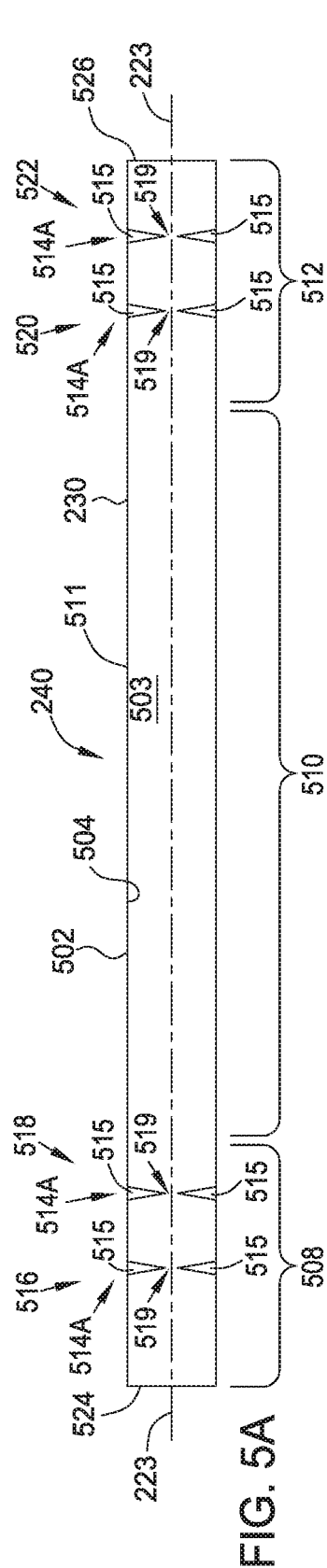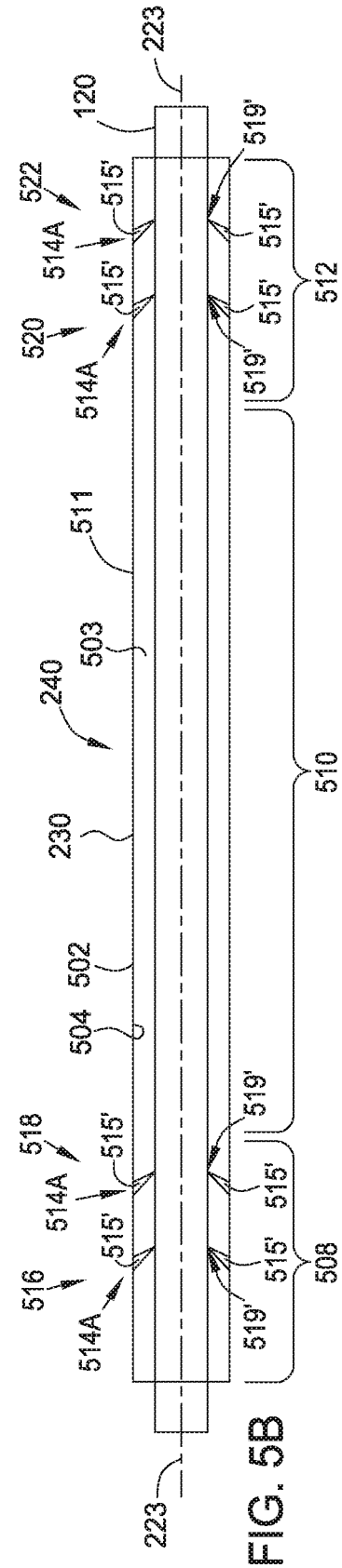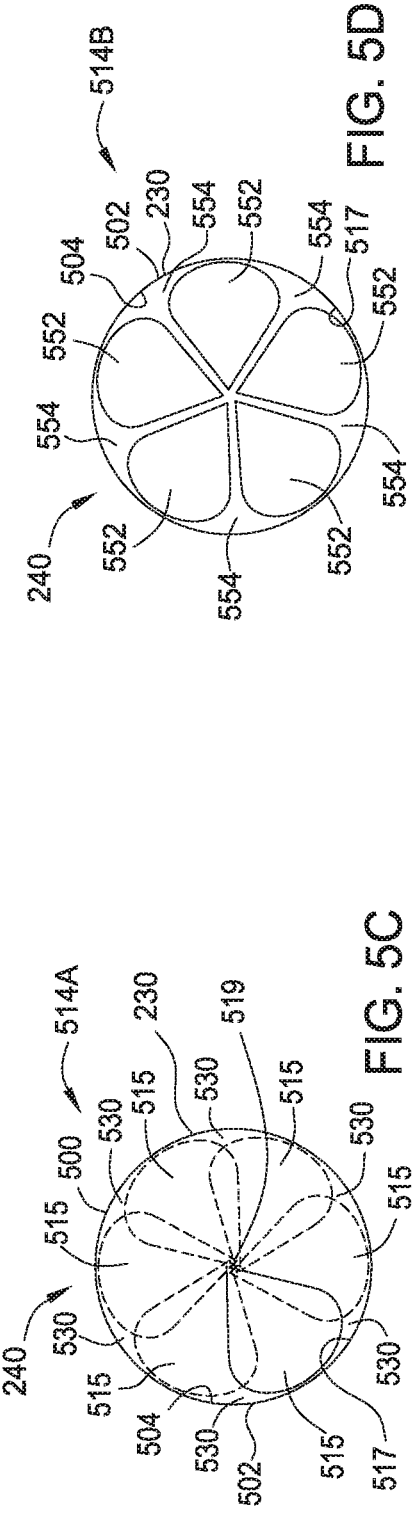

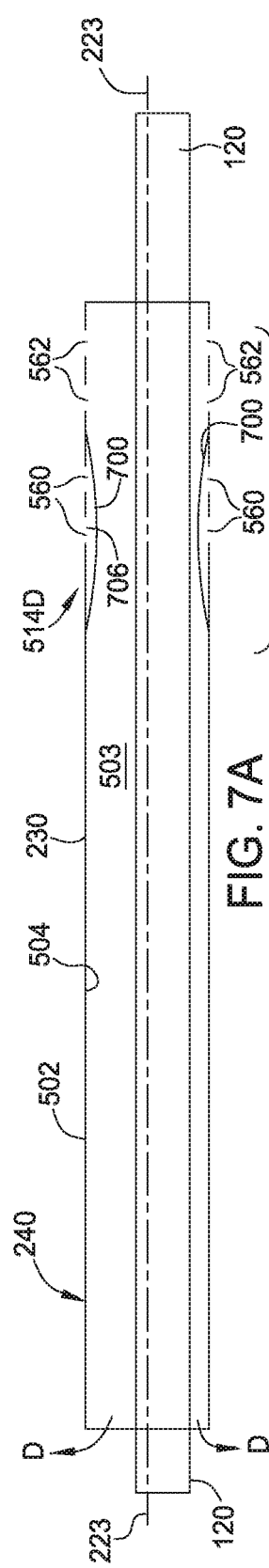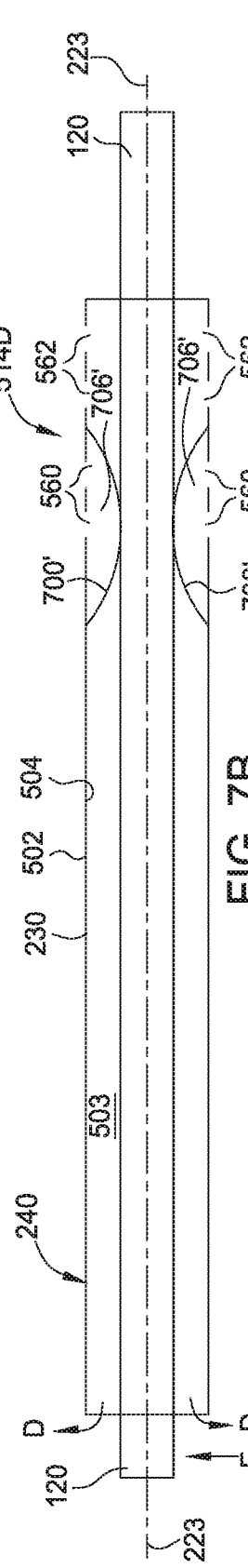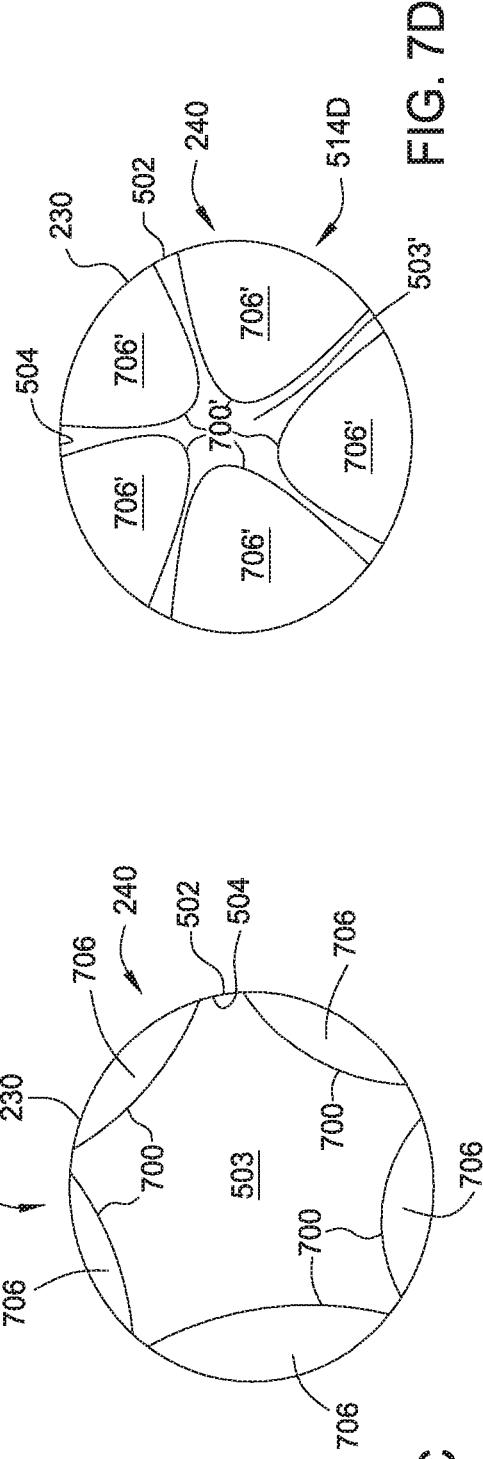

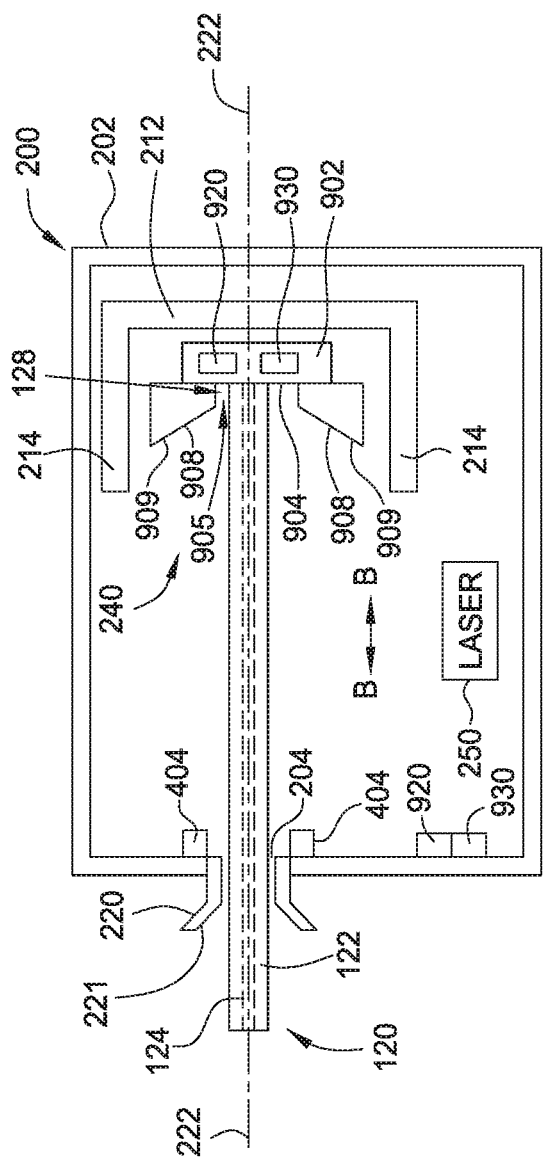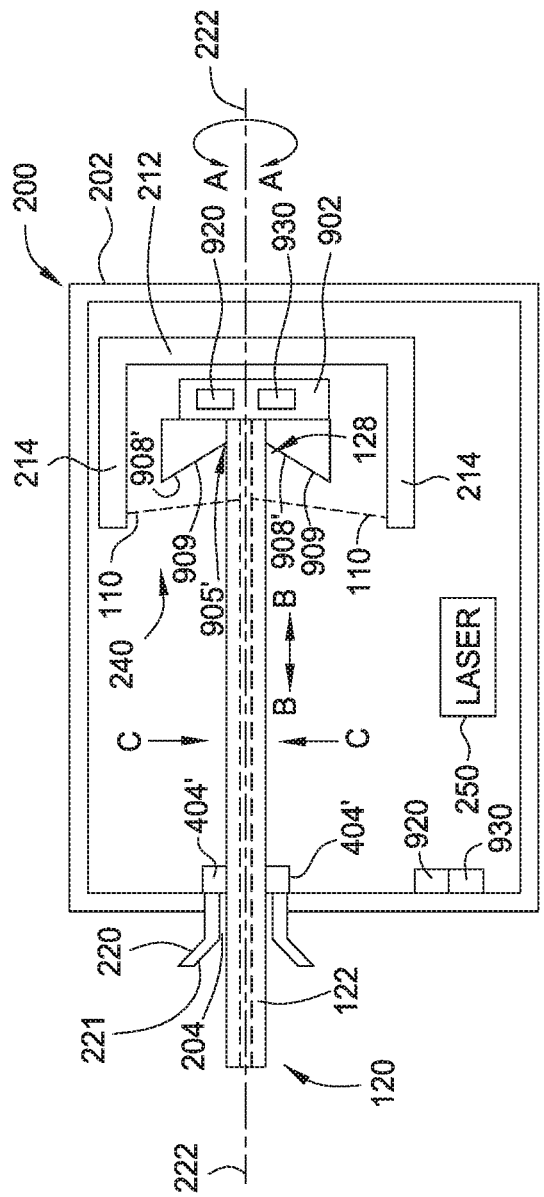

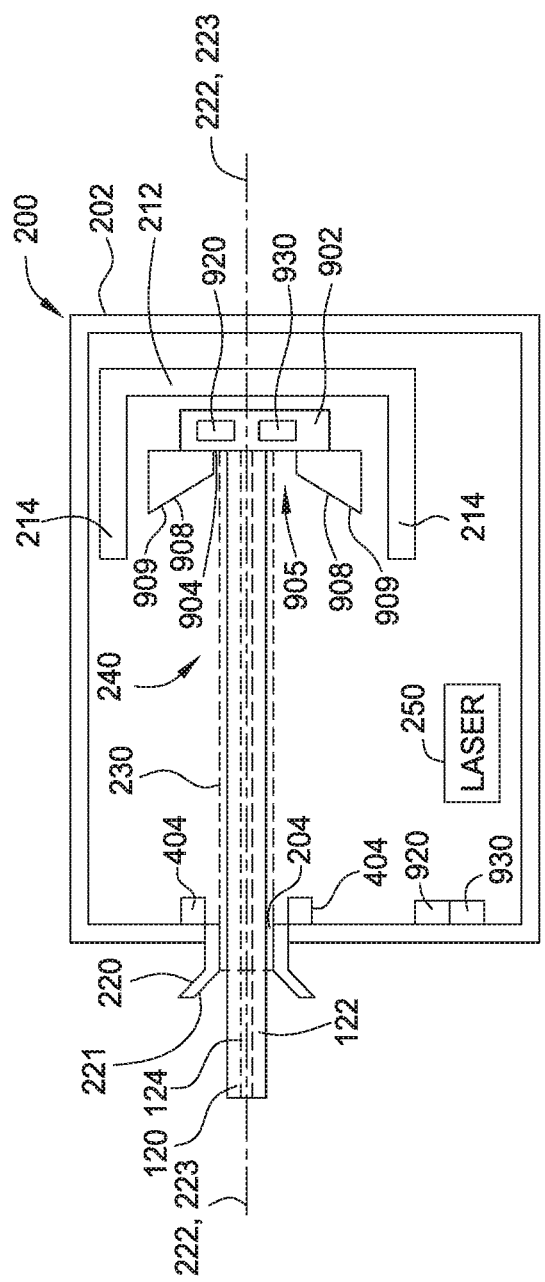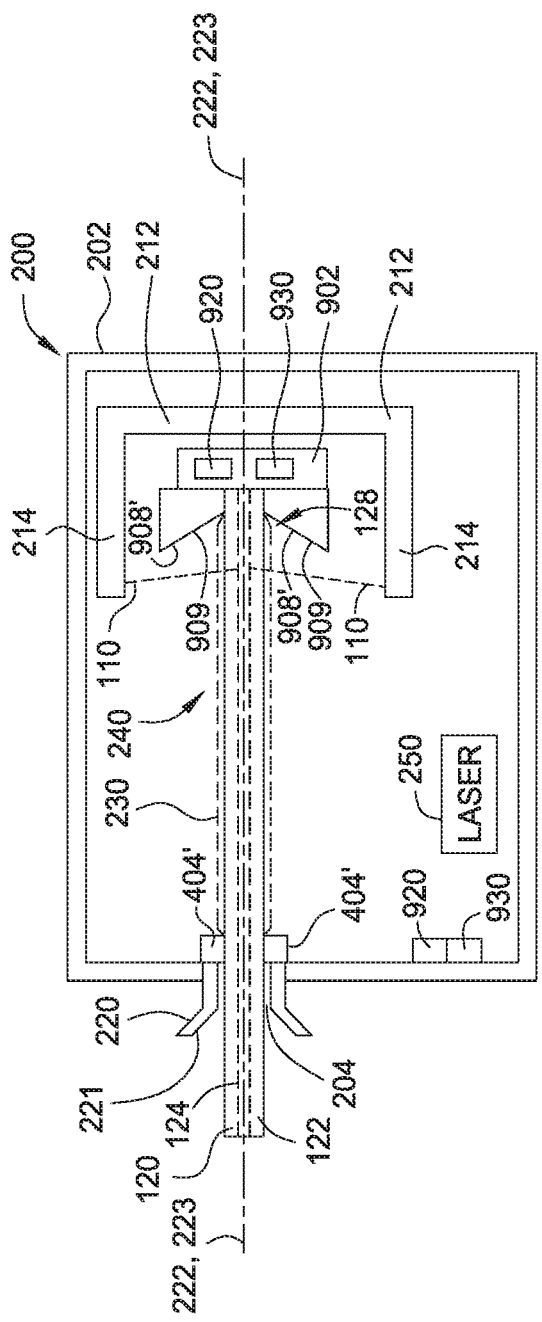

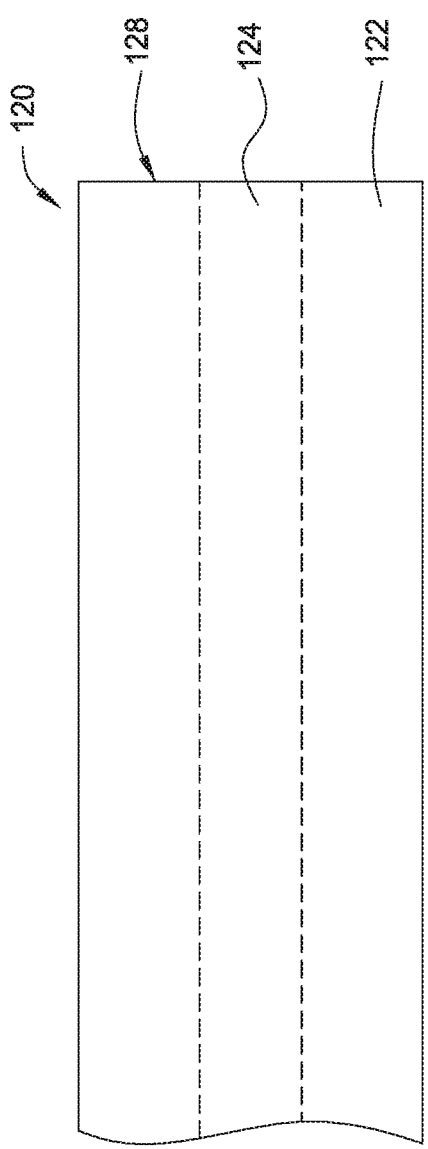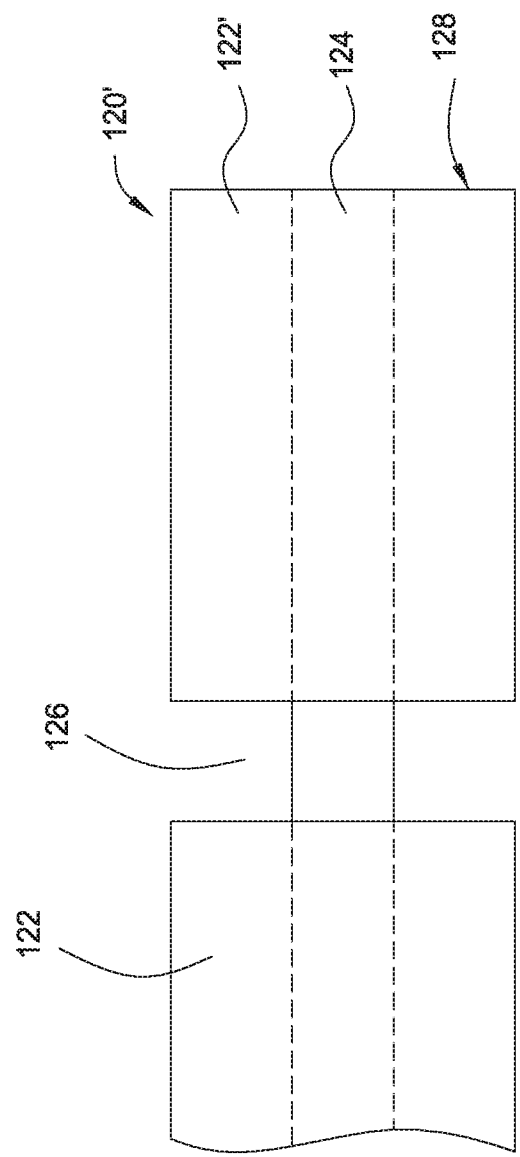

LASER WIRE PROCESSING DEVICE

CROSS-REFRENCE TO RELATED APPLICATIONS

This application claims benefit of and priority to U.S. application Ser. No. 15/199,896 filed Jun. 30, 2016. The aforementioned patent application is herein incorporated by reference in its entirety.

BACKGROUND

Lasers can be used for cutting an insulation layer of a conductive wire such that a portion of the insulation can be subsequently removed to expose the conductor. Wire is typically wound around a spool and is unwound from the spool as needed. In some instances, the unspooled wire exhibits a "memory" effect, wherein wire curvature is maintained after the wire is unspooled. Such curvature of the wire can make it difficult to center a free end of the wire with respect to cutting laser(s) in a laser wire-processing device. As a result of the wire end being off center relative to the cutting laser(s), the insulation layer may not be cut completely and/or at least a portion of the insulation layer may be cut inadvertently.

SUMMARY

According to one aspect, a laser wire-processing device comprises a housing and an aperture in a side of the housing. A longitudinal axis extends through and is substantially perpendicular to the aperture. The laser wire-processing device further comprises a backstop arranged in the housing and aligned with the longitudinal axis. The backstop defines a wire-contact surface in a facing relationship with the aperture. The laser wire-processing device further comprises a wire guide arranged in the housing to manipulate a wire inserted through the aperture into a desired cutting position along and relative to the longitudinal axis between the aperture and the backstop. The laser wire-processing device further comprises a laser operable to direct at least one laser beam toward an insulation layer of the wire while in the desired cutting position.

According to one aspect, a method for processing a wire with an insulation layer comprises arranging a wire guide, comprising a tube, in an aperture of a laser wire-processing device. The tube forms a passageway, and the passageway and the aperture define a longitudinal axis. The method also includes inserting the wire into the wire guide. The method also includes operating at least one laser beam in the laser wire-processing device to cut the insulation layer around a periphery of the wire at a location along the longitudinal axis. The method also includes removing the wire from the laser wire-processing device.

According to one aspect, a method of preparing a wire to strip an insulation layer of the wire comprises inserting an end of the wire through an aperture in a laser wire-processing device housing a backstop. The backstop comprises a backstop guide having an inclined surface that tapers from a diametrically larger opening to a diametrically smaller opening while moving in a direction away from the aperture along a longitudinal axis that extends between the aperture and the backstop. The method also comprises urging the end of the wire toward the longitudinal axis as the wire moves along the inclined surface from the diametrically larger opening to the diametrically smaller opening. The method also comprises gripping the end of the wire with the backstop guide. The method also comprises applying tension to the wire. The method also includes operating a laser in the laser wire-processing device to cut the insulation layer around a periphery of the wire. The method also comprises releasing the end of the wire from the backstop guide. The method also comprises removing the wire from the laser wire-processing device.

According to one aspect, a wire guide comprises a tube configured for insertion into a laser wire-processing device. The tube forms a passageway that defines a longitudinal symmetry axis. The passageway is configured to receive a wire therethrough. The wire guide also comprises a first centering member arranged in the passageway of the tube at a first location along the longitudinal axis, wherein the first centering member urges the wire in the passageway toward the longitudinal axis of the passageway.

BRIEF DESCRIPTION OF ILLUSTRATIONS

FIG. 1A is a cross-sectional side view of a laser wire-processing device that includes a wire guide with a tube and a first aspect of a backstop, according to one aspect;

FIG. 3A is a cross-sectional side view of a laser wire-processing device that includes a wire guide having a tube, and further, includes clamps to grip the tube and a wire within the tube, according to one aspect;

FIG. 3B is a cross-sectional side view of the laser wire-processing device of FIG. 3A, wherein the clamps are illustrated in a clamped position;

FIG. 5A is a cross-sectional side view of a wire guide according to one aspect for use with a laser wire-processing device;

FIG. 5B is a cross-sectional side view of the wire guide of FIG. 5A illustrating a wire inserted in the wire guide;

FIG. 5C is an end view of the wire guide of FIG. 5A;

FIG. 5D is an end view of a variation of aspect of the wire guide illustrated in FIG. 5A;

FIG. 7A is a cross-sectional side view of a wire guide according to one aspect for use with a laser wire-processing device, wherein a centering member in the wire guide is illustrated in an unexpanded state;

FIG. 7B is a cross-sectional side view of the wire guide of FIG. 7A, wherein the centering member in the wire guide is illustrated in an expanded state;

FIG. 7C is an end view of the wire guide of FIG. 7A showing the centering member in the wire guide is illustrated in an unexpanded state;

FIG. 7D is an end view of the wire guide of FIG. 7A showing the centering member in the wire guide is illustrated in an expanded state;

FIG. 10A is a cross-sectional side view of the laser wire-processing device, including an exemplary backstop having a wire guide capable of gripping a wire, and wherein the wire guide is shown in an open configuration to receive the wire;

FIG. 10B is a cross-sectional side view of the laser wire-processing device of FIG. 9A, wherein the wire guide is in a closed state to grip the wire;

FIG. 10C is a cross-sectional side view of the laser wire-processing device of FIG. 10A, including a tube arranged therein and wherein the wire guide is shown in an open configuration to receive the tube;

FIG. 10D is a cross-sectional side view of the laser wire-processing device of FIG. 10C, and wherein the wire guide is shown in an open configuration to grip the tube;

FIG. 12A is a side view of a wire before processing;

FIG. 12B is a side view of a processed wire.

DETAILED DESCRIPTION

Figure 1B:
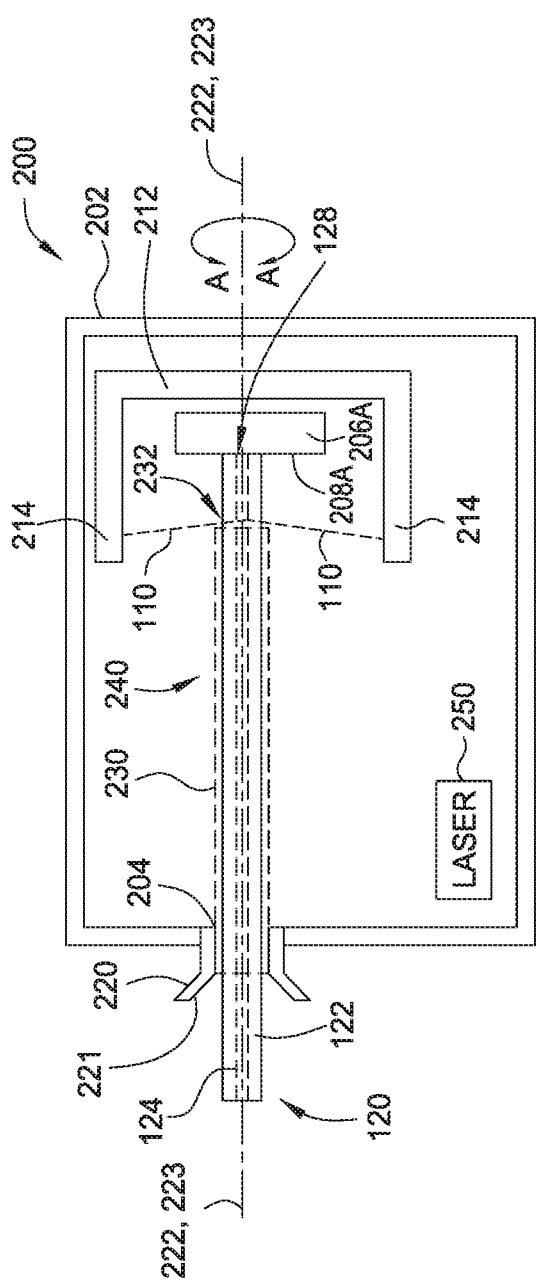
FIG. 1B is a cross-sectional side view of a laser wire-processing device that includes a wire guide with a tube, according to one aspect.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

In aspects described herein, a laser wire-processing device includes a wire guide that enables an operator to correctly position a curved or bent wire exhibiting a "memory" effect within the laser wire-processing device. In operation, the wire guide properly aligns the wire to laser(s) cutter in the laser wire-processing device such that the insulation layer is completely severed without cutting the electrical conductor. The wire guide may be implemented using various aspects. For example, in one aspect, the wire guide is implemented as a tube that is inserted into the laser wire-processing device and extends along a longitudinal axis that defines a centerline for the laser(s) of the laser wire-processing device. The tube has sufficient stiffness to urge the curved wire passing therethrough toward alignment with the longitudinal axis. In another aspect, the wire guide includes a centering member installed therein. In a still further aspect, the wire guide is implemented as backstop guides arranged on a backstop in the laser wire-processing device that urge an end of the wire into alignment. Thereafter, in at least one aspect, the backstop guides can be clamped to grip the wire therebetween. Thereafter, tension can be applied to the curved wire to straighten the wire along the longitudinal axis.

FIG. 1A is a cross-sectional side view of a laser wire-processing device 200 for cutting an insulation layer 122 of a wire 120. The insulation layer 122 surrounds a conductor 124 within the wire 120. In use, a portion of the insulation layer 122 is removed (i.e., "stripped") to expose the conductor 124 such that the wire 120 may be electrically connected to another electrical device, such as a socket. In the exemplary aspect, the laser wire-processing device 200 includes a housing 202 with an aperture 204 sized to receive the wire 120 and, in some aspects, a wire guide 240 therethrough. The aperture 204 is centered on a longitudinal axis 222 that intersects a cutting region where the insulation layer 122 is cut. A laser 250 is provided in the laser wire-processing device 200 that is operable to generate one or more laser beams 110 for cutting the insulation layer 122 of the wire 120 in the cutting region.

The laser wire-processing device 200 includes a turret 212 and beam steering devices 214 in the housing 202 that direct the laser beams 110 toward the wire 120. The turret 212 enables rotation of the beam steering devices 214 about the longitudinal axis 222 (indicated by arrows A) such that the laser beams 110 can cut the insulation layer 122 circumferentially around a periphery 125 of the wire 120. The beam steering devices 214 guide, steer, and/or direct the laser beam 110 toward a particular location along the longitudinal axis 222. To that end, the beam steering devices 214 could include at least one of mirrors, prisms, and fiber optics that guide, steer, and/or direct the laser beam 110 toward the particular location. In the aspect illustrated in FIG. 1A, the turret 212 includes two beam steering devices 214 arranged 180° apart. Each beam steering device 214 emits a laser beam 110 such that the turret 212 and the two beam steering devices 214 rotate 180° (or slightly more to ensure overlap) about the longitudinal axis 222 to cut through an entire outer periphery 125 of the insulation layer 122 of the wire 120. In various other aspects, the turret 212 could include one beam steering device 214 or three or more beam steering devices 214. In aspects in which the turret 212 includes a single beam steering device 214, the turret 212 would rotate 360° (or slightly more to ensure overlap) about the longitudinal axis 222 to cut through the entire outer periphery 125 of the insulation layer 122 of the wire 120. In other aspects, the laser beams 110 are stationary and the wire 120 can be rotated in one or more of the directions indicated by arrow A such that a periphery 125 of the wire 120 is exposed to the laser beams 110.

The laser wire-processing device 200 includes a backstop 206A arranged in the housing 202. The backstop 206A includes a wire-contact surface 208A in a facing relationship with the aperture 204. An end 128 of the wire 120 abuts the wire-contact surface 208A of the backstop 206A such that the wire-contact surface 208A prevents further movement of the wire 120 into the laser wire-processing device 200. The wire-contact surface 208A may be provisioned with a feature such as a detent or other texturing to assist in preventing the wire from sliding on the wire-contact surface 208A. The backstop 206A can be moved in the directions of arrows B toward or away from the aperture 204 and also relative to the turret 212 and beam steering devices 214. Accordingly, moving the backstop 206A toward the aperture 204 decreases a length of the insulation layer 122 to be cut from the wire 120 by the laser beam 110. Conversely, moving the backstop 206A away from the aperture 204 increases a length of the insulation layer 122 to be cut from the wire 120 by the laser beam 110. Accordingly, the backstop 206A is adjustable to enable an operator to select a length of the insulation layer 122 to be removed from the wire 120. In various aspects, the length selected may be between approximately 1.25 inches (3.18 cm) and approximately 5.0 inches (12.7 cm).

In the exemplary aspect illustrated in FIG. 1A, the laser wire-processing device 200 includes a wire guide 240. In the aspect illustrated in FIG. 1A, the wire guide 240 is implemented as a hollow tube 230 that has a passageway formed therethrough, where the passageway is sized to receive the wire 120. The tube 230 is disposed between the aperture 204 and the wire-contact surface 208A of the backstop 206A along the longitudinal axis 222. The tube 230 has suitable stiffness such that the wire 120 is maintained in a substantially linear shape along the length of the tube 230, i.e. the distance between the aperture 204 and the wire-contact surface 208A of the backstop 206A. The tube 230 defines a longitudinal symmetry axis 223. The longitudinal symmetry axis 223 is an axis about which the tube 230 is symmetric or about which the tube 230 has a repeating shape or profile. For example, in aspects in which the tube 230 has a circular cross-sectional profile, the tube 230 is symmetric at all points about the longitudinal symmetry axis 223. As another example, in aspects in which the tube 230 has a pentagonal cross-sectional profile, the tube 230 repeats a profile five times about the longitudinal symmetry axis. When the wire 120 is inserted into the tube 230, the tube 230 urges the wire 120 into alignment with the longitudinal symmetry axis 223. When the tube 230 is inserted into the laser wire-processing device 200, the aperture 204 aligns the longitudinal symmetry axis 223 with the longitudinal axis 222 of the laser wire-processing device 200 such that the axes 222 and 223 are substantially coaxial. As a result of the substantially coaxial alignment between the longitudinal symmetry axis 223 of the tube 230 with the longitudinal axis 222 of the laser wire-processing device 200, the wire 120 inserted in the tube 230 is substantially aligned with the longitudinal axis 222 of the laser wire-processing device 200.

In various aspects, the wire guide 240 may be provisioned with a variety of tubes 230 each having different sized diameters to accommodate wires of different diameters. In one aspect, and as discussed in greater detail below with reference to FIGS. 4A-4C, a tube 230 is selected to have a passageway with an inner diameter that is slightly larger than an outside diameter of the wire 120 to be processed. By selecting from among tubes 230 in such a manner, the wire 120 may be kept as close to the longitudinal axis 222 as possible.

In various aspects, the laser wire-processing device 200 also includes a funnel 220 disposed in front of the aperture 204. The funnel 220 has a frustoconical interior surface 221 that has a diametrically enlarged opening at a front end and tapers to a diametrically narrower opening at a backend that is adjacent to the aperture 204. When the tube 230 is used in the laser wire-processing device 200, as shown in FIG. 1, the funnel 220 facilitates insertion of the tube 230 into the aperture 204. Optionally, when the tube 230 is not used, the funnel 220 is sized to facilitate insertion of the wire 120 into the aperture 204.

In operation, a tube 230 of the appropriate diameter is selected according to the diameter of the wire to be cut. The tube 230 is then inserted through the aperture 204 of the housing 202 along the longitudinal axis 222 until an end 232 of the tube 230 contacts the wire-contact surface 208A of the backstop 206A. The wire 120 is then inserted through the passageway in the tube 230. Alternatively, the wire 120 is inserted into the tube 230 first, and then the tube 230 with the wire 120 therein is inserted through the aperture 204. In either case, the funnel 220 will assist in guiding the tube 230 and wire 120 into registration with the aperture 204.

As noted above, the backstop 206A is capable of bidirectional movement along the longitudinal axis 222 in order to position the wire 120 according to the desired length of insulation layer 122 to be cut. Accordingly, the tube 230 and the wire 120 therein are slidably disposed in the aperture 204. Thus, as the backstop 206A moves toward the aperture 204, the tube 230 is pushed out of the aperture 204 by the wire-contact surface 208A of the backstop 206A, and the wire 120 (with the end 128 abutting the backstop 206A) is also pushed out of the aperture 204. Likewise, as the backstop 206A moves away from the aperture 204, the tube 230 can be pushed in (or drawn in) to the aperture 204, and the wire 120 can also be pushed (or drawn) into the aperture 204, to remain in contact with the wire-contact surface 208A of the backstop 206A. Alternatively, the backstop 206A may be moved into the desired position before the tube 230 and wire 120 are inserted into the housing 202.

FIG. 1B illustrates an aspect of the laser wire-processing device 200 in which the tube 230 is inserted through the aperture 204 such that the end 232 of the tube 230 is positioned proximate to but not in the path of the laser beam(s) 110. As discussed above, the tube 230 maintains the wire 120 in a substantially linear shape along the length of the tube 230 and in alignment with the longitudinal axis 222 of the laser wire-processing device 200. In operation, when the end 232 of the tube 230 is positioned proximate to the laser beam(s) 110, then the location of the wire 120 to be cut, slightly extending from the end 232 of the tube 230, is substantially aligned with the longitudinal axis 222. In the aspect disclosed in FIG. 1B, the backstop 206 could be eliminated. A length of wire to be cut could be determined based on a length of wire inserted through the aperture. For example, suppose that the tube 230 has a length of 4 inches (10.16 cm) and the laser beam(s) is(are) positioned 0.05 inches (0.13 cm) past the end 232 of the tube 230. If 1 inch (2.54 cm) of the insulation layer 122 is to be removed from the wire 120, then a total of 5.05 inches (12.83 cm) of wire would be inserted through the aperture 204. If 2 inches (5.08 cm) of the insulation layer 122 is to be removed from the wire 120, then a total of 6.05 inches (15.37 cm) of wire would be inserted through the aperture 204. Such linear calculations are possible because the tube 230 maintains the wire 120 in a substantially linear shape between the aperture 204 and the end 232 of the tube 230.

Figure 2:
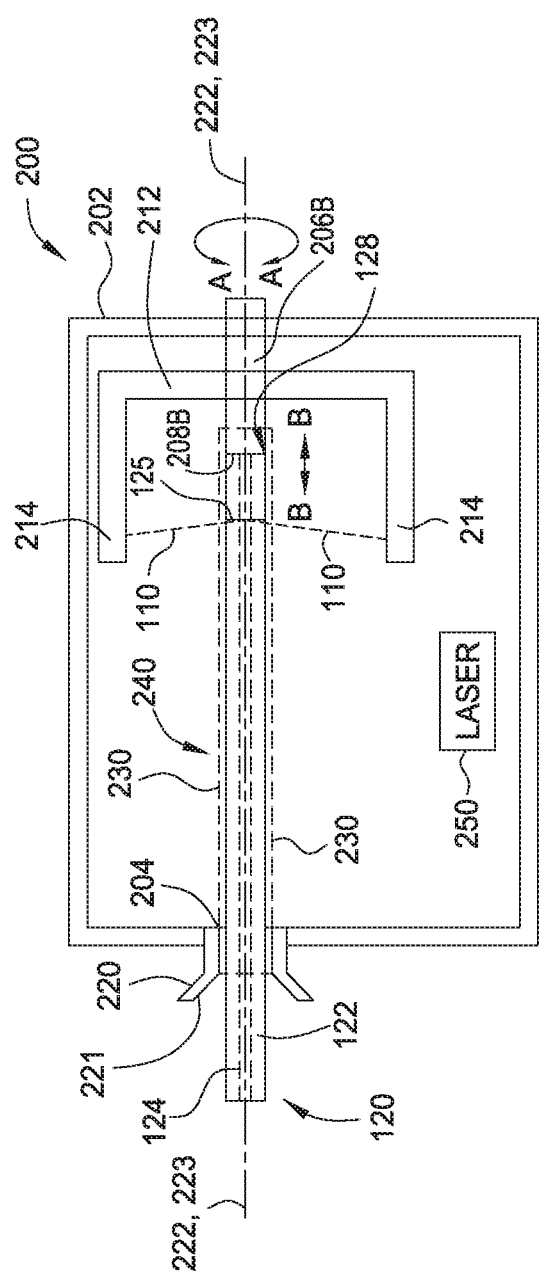
FIG. 2 is a cross-sectional side view of a laser wire-processing device that includes a wire guide with a tube and a second aspect of a backstop, according to one aspect.

FIG. 2 is a cross-sectional side view of a laser wire-processing device 200 illustrating a variation of the laser wire-processing device 200 illustrated in FIG. 1A, according to one aspect, in which the backstop 206B is sized and shaped as a post to fit within the tube 230. Accordingly, where the tube 230 has a cylindrical passageway, the post-shaped backstop 206B has a corresponding cylindrical cross-section such that a wire-contact surface 208B of the backstop 206B in a facing relationship with the aperture 204 fits within tube 230. In such aspects, at least the wire-contact surface 208B of the backstop 206B can translate into and out of the tube 230 in the direction of arrows B. In this arrangement, the tube 230 can be stationary with respect to the aperture 204 and the wire 120, while the length of the insulation to be cut is determined by the axial movement of the backstop 206B. That is, the wire 120 can be placed into the desired cutting position by moving the backstop 206B toward or away from the aperture 204 along the longitudinal axis 222, while the tube 230 remains stationary.

FIGS. 3A and 3B are cross-sectional side views of a laser wire-processing device 200 illustrating a variation of the laser wire-processing device 200 illustrated in FIG. 1A, in which a pair of clamps 404 and 410 are configured to grip the tube 230 or the wire 120 in aspects in which the tube 230 is not used. To this end, the laser wire-processing device 200 is provisioned with clamps 404 and 410. A first provision of clamps 410 is arranged on the wire-contact surface 208A of the backstop 206A that faces the aperture 204 and a second provision of clamps 404 is arranged proximate to the aperture 204 within the housing 202. The clamps 404, 410 are actuatable between an unclamped position (shown in FIG. 3A) and a clamped position (shown in FIG. 3B). In the unclamped position, the clamps 404, 410 form a diametrically larger opening relative to the clamped position. In at least one aspect, the clamps 404 and 410 are connected to actuators 920 that move the clamps 404 and 410 between the clamped and unclamped positions. For example, the actuators 920 could be solenoids or pneumatic pistons. In at least one aspect, clamps 404 and 410 are connected to biasing members 930, such as springs or elastomeric members, which bias the clamps 404 and 410 into either the clamped positions or unclamped positions. In at least one aspect, the clamps 404, 410 are connected to both the actuators 920 and the biasing members 930. In such an arrangement, the biasing members 930 would urge the clamps 404, 410 into one configuration (either clamped or unclamped) and the actuators 920 would overcome the bias of the biasing members 930 to urge the clamps 404, 410 into the other configuration.

In one aspect (illustrated by FIGS. 3A and 3B), the tube 230 may be positioned in a spaced-apart manner such that the end 232 of the tube 230 is not in contact with the wire-contact surface 208A of the backstop 206A with the wire 120 extending through the tube 230 with an end 128 of the wire 120 in contact with the wire-contact surface 208A of the backstop 206A. In such an aspect, the clamps 410 arranged on the wire-contact surface 208A of the backstop 206A may only grip the end 128 of the wire 120 when moved to the clamped position shown in FIG. 3B. The clamps 404 arranged proximate to the aperture 204 grip the tube 230 and the wire 120 therein. The tube 230 may be flexible such that the clamps 404 can deform the tube 230 to apply a gripping force to the wire 120 within the tube 230 (as illustrated in FIG. 3B). In another aspect, both the tube 230 and the end 128 of the wire 120 may be positioned in contact with the wire-contact surface 208A of the backstop 406 such that the clamps 410 arranged on the wire-contact surface 208A of the backstop 206A may grip both the tube 230 and the wire 120 therein.

In operation, the clamps 404, 410 can be manipulated into the unclamped position by appropriate operation of the actuators 920 and biasing members 930. In the unclamped position, the clamps 404, 410 form an opening sufficiently large to receive the tube 230 and wire 120. Accordingly, the tube 230 and the wire 120 can be inserted through the aperture 204 and brought into contact with the backstop 406. The clamps 404, 410 can then be moved in the direction of arrows C into the clamped position (indicated by reference numerals 404' and 410' in FIG. 3B) such that the tube 230 and the wire 120 are held in place along the longitudinal axis 222. In at least one aspect, the clamps 410 arranged on the backstop 206A are moved to the clamped position shown in FIG. 3B before the clamps 404 proximal to the aperture 204. In in this way, tension may be applied to the wire 120 to render the wire taut and thereby aligned with the longitudinal axis 222. Thereafter, while the tension in the wire 120 is being maintained, the clamps 404 proximal to the aperture 204 are moved to the clamped position, shown in FIG. 3B, such that the wire 120 between the clamps 404 and 410 is maintained in a taut state that is aligned with the longitudinal axis 222.

Figure 4A:
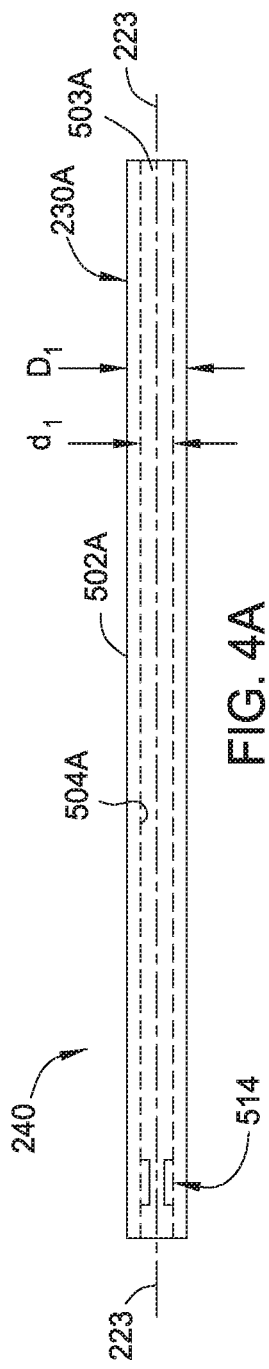
FIG. 4A is a side view of a tube according to one aspect.
Figure 4B:
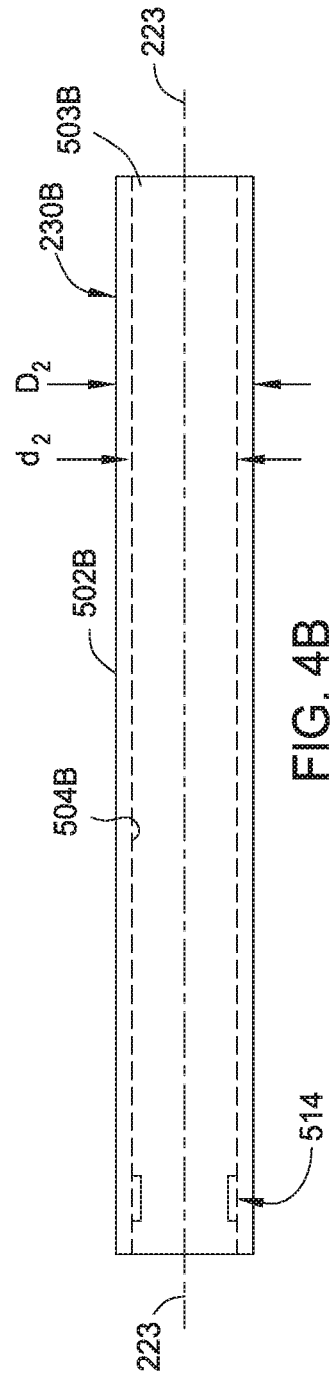
FIG. 4B is a side view of a tube having a diameter relatively greater than the tube shown in FIG. 4A.
Figure 4C:
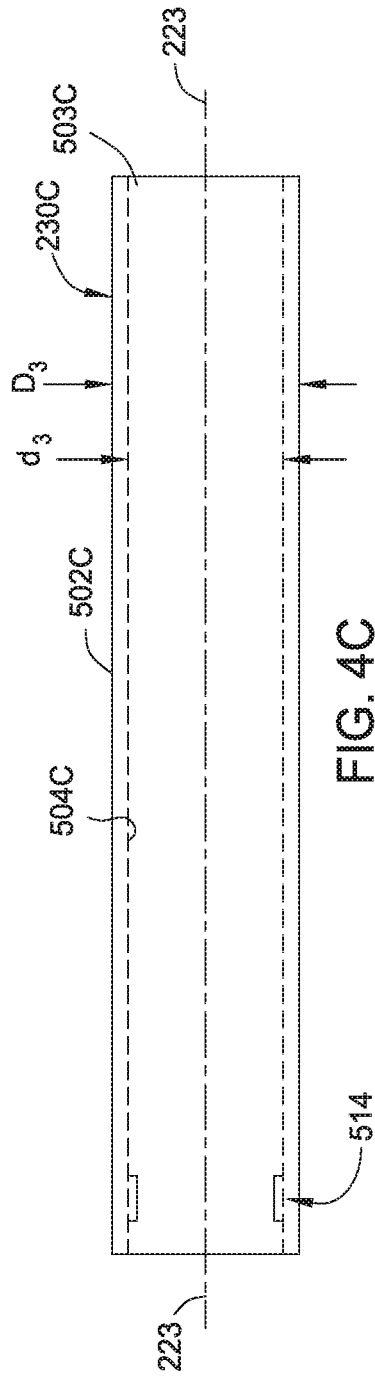
FIG. 4C is a side view of a tube having a diameter relatively greater than the tube shown in FIG. 4B.

FIGS. 4A-4C are cross-sectional side views of a wire guide 240 implemented as three different tubes 230 having different sizes that could be used with differently-sized wires (i.e., wires having different exterior dimensions). FIG. 4A illustrates a first tube 230A with an exterior surface 502A and an interior surface 504A. A dimension (e.g., a diameter) of the exterior surface 502A is $D_1$ and a dimension of the interior surface 504A is $d_1$. The passageway 503A through the tube 230A also has a dimension of $d_1$. FIG. 4B illustrates a second tube 230B with an exterior surface 502B and an interior surface 504B. A dimension of the exterior surface 502B is $D_2$ and a dimension of the interior surface 504B is $d_2$. The passageway 503B through the tube 230B also has a dimension of $d_2$. The dimensions $D_2$ and $d_2$ of the second tube 230B are larger than the dimensions $D_1$ and $d_1$, respectively, of the first tube 230A. FIG. 4C illustrates a third tube 230C with an exterior surface 502C and an interior surface 504C. A dimension of the exterior surface 502C is $D_3$ and a dimension of the interior surface 504C is $d_3$. The passageway 503C through the tube 230C also has a dimension of $d_3$. The dimensions $D_3$ and $d_3$ of the third tube 230C are larger than the dimensions $D_2$ and $d_2$, respectively, of the second tube 230B. The tubes 230A, 230B, and 230C are merely illustrative of tubes that could be included in a wire processing kit. The tubes 230A, 230B, and 230C are configured for selective insertion into the aperture 204 for use with wires (e.g., the wire 120) having different exterior dimensions. In various aspects, such a wire processing kit could include more or fewer than the three illustrated tubes 230A, 230B, and 230C. In use, an operator of the laser wire-processing device (e.g., a worker or a machine) would select a tube with the smallest passageway dimension that is larger than an outer periphery of a wire to have a portion of its insulation layer 122 severed by the laser wire-processing device 200. With reference to FIGS. 1 and 2, the user would insert a funnel 220 with an interior dimension equal to or slightly larger than a dimension of the exterior surface of the selected tube. Thereafter, the selected tube in funnel 220 would be inserted into the aperture 204 of the laser wire-processing device to process the wire.

In various aspects, the tubes 230A, 230B, and 230C can optionally include centering members 514, which are discussed in greater detail below with reference to FIGS. 5A-D, 6A, 6B, and 7A-F. The various centering members 514 are arranged in the passageway 503 of the respective tube and urge a wire in the passageway toward the longitudinal symmetry axis 223.

Wire guides 240 comprising the respective tubes 230A, 230B, and 230C illustrated in FIGS. 4A-4C are suitable for use in the laser wire-processing devices 200 shown in FIGS. 1, 2, 3A, and 3B.

In various aspects, the tube 230 of the wire guide 240 inserted through the aperture 204 of the laser wire-processing device 200 can include centering members 514 arranged in the passageway 503 to urge the wire 120 into alignment with the longitudinal symmetry axis 223 and therefore into alignment with the longitudinal axis 222 of the laser wire-processing device when the tube 230 is disposed in the aperture 204 such that the longitudinal symmetry axis 223 of the tube 230 is aligned in a substantially coaxial manner with the longitudinal axis 222 of the laser wire-processing device 200.

FIG. 5A is a cross-sectional side view of a wire guide according to one aspect that includes a plurality of centering members 514A; FIG. 5B is a cross-sectional side view of the wire guide of FIG. 5A illustrating a wire inserted in the wire guide and maintained in position via the plurality of centering members 514A. Referring to FIG. 5A, as discussed above, the tube 230 includes the exterior surface 502 and the interior surface 504, wherein the interior surface 504 forms the passageway 503. The passageway 503 extends from a first end 524 of the tube 230 to a second end 526 of the tube 230. In this aspect, the tube 230 includes a plurality of centering members 514A that are installed at various locations within the tube 230. In this aspect, the centering members 514A extend from the interior surface 504 toward the longitudinal symmetry axis 223 at one or more locations along the longitudinal symmetry axis 223. The centering members 514A are depicted in FIG. 5A in a relaxed state and define an opening 519 therethrough. For example, FIG. 5A illustrates a first centering member 514A extending from the interior surface 504 of the tube 230 at a first location 516 along the longitudinal symmetry axis 223, a second centering member 514A extending from the interior surface 504 at a second location 518 along the longitudinal symmetry axis 223, a third centering member 514A extending from the interior surface 504 at a third location 520 along the longitudinal symmetry axis 223, and a fourth centering member 514A extending from the interior surface 504 at a fourth location 522 along the longitudinal symmetry axis 223. The tube 230 includes three regions: a first end portion 508 extending to the first end 524, a second end portion 512 extending to the second end 526, and a middle portion 510 between the first and second end portions 508 and 512. The middle portion 510 defines a laser cutting region 511 of the tube 230. The tube 230 is insertable through the aperture 204 of the housing 202 such that the laser beam 110 impinges on the tube 230 in the laser cutting region 511 defined by the middle portion 510. The locations 516, 518, 520, and 522 of the centering members 514A along the longitudinal symmetry axis 223 are in the first end portion 508 and the second end portion 512 such that the centering members 514A are not impinged upon by the laser beam 110.

FIG. 5B illustrates the tube 230 of FIG. 5A with the wire 120 inserted through the passageway 503 therein. As illustrated, the centering members 514A are deflected to a flexed state to accommodate the wire 120, but will return to the un-deflected state (i.e., the relaxed state) illustrated in FIG. 5A when the wire 120 is removed. Stated differently, the centering members 514A are resilient and biased toward the position illustrated in FIG. 5A. The opening 519 in the relaxed state (shown in FIG. 5A) is smaller than the opening 519' in the in the flexed state to accommodate the wire 120 therethrough. In one aspect, the centering members 514A are made of a plastic material or a silicone polymer material that is flexible. As a result, when the wire 120 is inserted through the passageway 503 in the tube 230, the deflected centering members 514A exert a biasing force on the wire 120 that urges the wire toward alignment with the longitudinal symmetry axis 223. As discussed above, when the tube 230 is inserted into the aperture 204 of the laser wire-processing device 200, the longitudinal symmetry axis 223 is aligned in a substantially coaxial manner with the longitudinal axis 222 of the laser wire-processing device 200. As a result, the wire 120 in the tube 230 is also aligned with the longitudinal axis 222 of the laser wire-processing device 200. p FIG. 5C illustrates an end view 500 of an exemplary centering member 514A that may be installed in the tube 230 shown in FIGS. 5A and 5B. In the exemplary aspect shown in FIG. 5C, the centering member 514A includes six compliant fronds 515 arranged around the interior surface 504 of the tube 230. For clarity, one of the compliant fronds 515 is illustrated in solid line and the remaining five compliant fronds 515 are illustrated in broken line. In various aspects, the tube 230 could include more or fewer than the illustrated six compliant fronds 515 at the locations 516, 518, 520, and 522 along the longitudinal symmetry axis 223. In one aspect, the compliant fronds 515 are individually attached to the interior surface 504 of the passageway 503. In another aspect, the plurality of compliant fronds 515 extends from a unitary member 517 (e.g., a ring) arranged around the interior surface 504 of the passageway 503. In one aspect, the unitary member 517 with attached fronds 515 can be inserted into the tube 230 and attached to the interior surface 504 of the passageway 503 with an adhesive. In certain aspects, the unitary member 517 and fronds 515 are made of the same material, such as a plastic or silicone polymer. The compliant fronds 515 are illustrated as having a guitar pick or tear drop shape. In various aspects, the compliant fronds 515 could have other shapes, such as circular shapes, oval shapes, lozenge shapes, or elliptical shapes. In FIG. 4C, adjacent compliant fronds 515 overlap toward the center of the passageway 503, and include gaps 530 between adjacent compliant fronds 515 along the interior surface 504. The gaps 530 provide an airflow path in the event suction is applied through the tube 230 via the aperture 204 in a wire laser-processing device 200 to remove any sort, smoke, or other particulates resulting from the laser beam 110 cutting through the insulation layer 122 of the wire 120.

FIG. 5D illustrates an end view of another exemplary centering member 514B that may be installed in the tube 230 shown in FIGS. 5A and 5B. In the exemplary aspect shown in FIG. 5D, the centering member 514B includes compliant fronds 552 that are smaller than the compliant fronds 515 illustrated in FIG. 4C. Additionally, the arrangement shown in FIG. 5D includes five compliant fronds 552 arranged around the interior surface 504 of the tube 230. In this aspect, the compliant fronds 552 do not overlap due, at least in part, to the reduced size. Thus, the compliant fronds 552 include gaps 554 between adjacent compliant fronds 552 along the interior surface 504 and also gaps between adjacent compliant fronds 552 all the way to the center of the passageway 503. In one aspect, the compliant fronds 552 are individually attached to the interior surface 504 of the passageway 503. In another aspect, the plurality of compliant fronds 552 extends from a unitary member 517 arranged around the interior surface 504 of the passageway 503.

A wire guide 240 that comprises the tube 230 illustrated in FIGS. 5A-5D is suitable for use in any of the laser wire-processing devices 200 shown in FIGS. 1, 2, 3A, 3B, and 4A-4C.

Figure 6A:
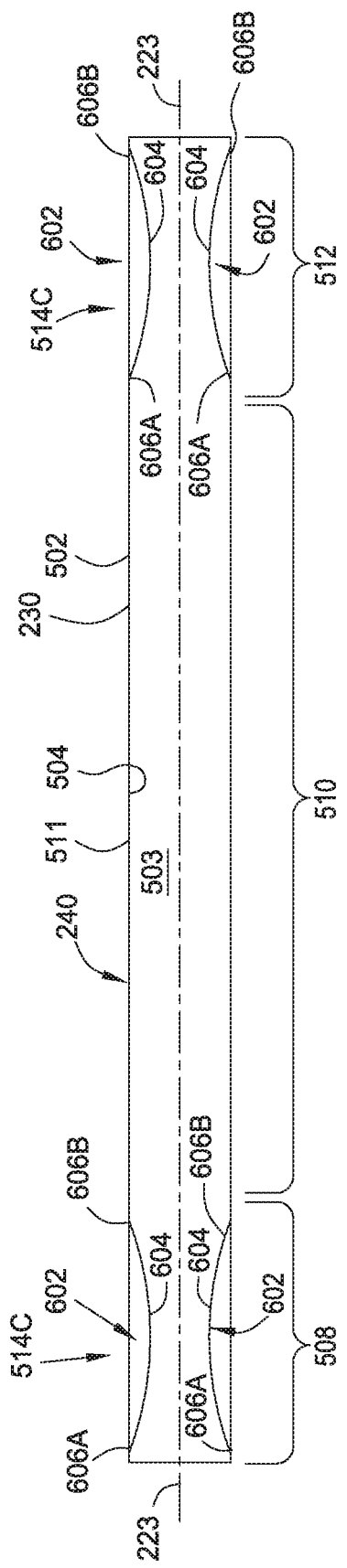
FIG. 6A is a cross-sectional side view of a wire guide according to one aspect for use with a laser wire-processing device.
Figure 6B:
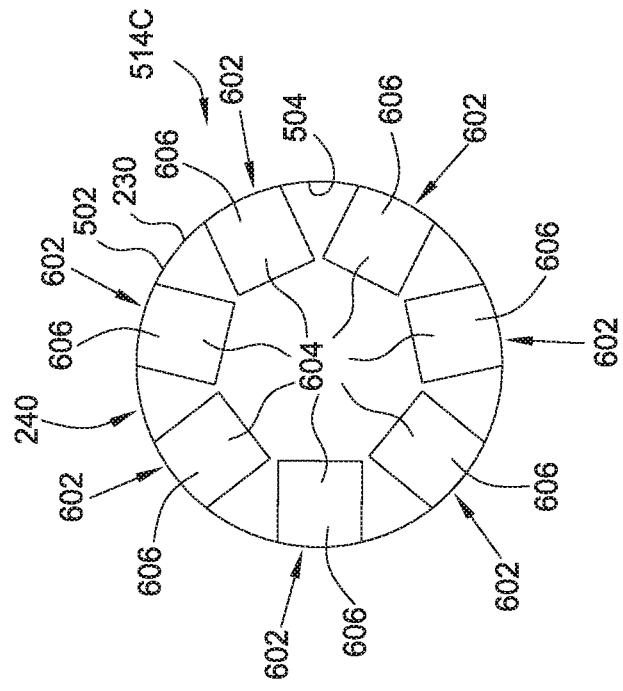
FIG. 6B is an end view of the wire guide of FIG. 6A.

FIG. 6A-6B are a cross-sectional side view and end view of the tube 230 of the wire guide 240 with different centering members 514C, according to another aspect, arranged around the interior surface 504 of the tube 230. In this aspect, the centering members 514C include leaf springs 602 arranged around the interior surface 504 at the first end portion 508 and the second end portion 512 that push against a wire 120 inserted through the passageway 503 to urge the wire 120 toward alignment with the longitudinal symmetry axis 223. The leaf springs include ends 606a and 606b attached to the interior surface 504 of the passageway such that middle portions 604 of the leaf springs 602 and to extend from the interior surface 504 of the passageway 503 toward the longitudinal symmetry axis 223. When a wire 120 is inserted through the passageway 503, the wire can push the middle portions 604 toward the interior surface 504 of the tube 230. The leaf springs 602, in turn, exert a spring force on the wire that urges the wire toward alignment with the longitudinal symmetry axis 223. FIG. 6B illustrates seven leaf springs 602 arranged around the interior surface 504 of the tube 230 in various aspects, a tube 230 could include more or fewer than seven leaf springs six and two arranged around the interior surface 504.

A wire guide 240 that comprises the tube 230 illustrated in FIGS. 6A and 6B is suitable for use in any of the laser wire-processing devices 200 shown in FIGS. 1, 2, 3A, 3B, and 4A-4C.

FIGS. 7A-7D are cross-sectional side views and end views of the tube 230 of the wire guide 240 with another centering member 514D, according to another aspect, arranged around the interior surface 504 of the tube 230. In this aspect, the centering members 514D include elastomeric grommets 700 arranged around the interior surface 504 that inflate to urge a wire 120 inserted through the passageway 503 toward alignment with the longitudinal symmetry axis 223. The tube 230 includes first apertures 560 and second apertures 562 arranged toward the second end portion 512 of the tube 230. The first apertures 560 are in communication with an interior volume 706 of the elastomeric grommets 700. The second apertures 562 are in communication with the passageway 503 through the tube 230. As illustrated in FIG. 7A, when a wire 120 is inserted through the tube 230, the wire 120 may not be aligned with the longitudinal symmetry axis 223 of the tube 230. FIG. 7C illustrates a relatively large passageway 503 between the elastomeric grommets 700 through which the wire 120 can pass. After the tube 230 and the wire 120 are inserted into a laser wire-processing device, a vacuum system is coupled in flow communication with the aperture 204 of the laser wire-processing device 200. The vacuum system is then activated such that air is pulled through the passageway 503 in the tube 230 in the direction of arrows D. The moving air in the passageway 503 reduces the air pressure in the passageway 503 according to the Venturi effect. Air in the interior volumes 706 of the elastomeric grommets 700 is stationary and therefore remains at atmospheric pressure. As a result, referring to FIGS. 7B and 7D, the elastomeric grommets 700 expand (i.e., the interior volumes of the elastomeric grommets 700 increase, as indicated by reference numeral 706') toward the longitudinal symmetry axis 223 to effectively narrow the diameter of the passageway 503, thereby urging the wire 120 into alignment with the longitudinal symmetry axis 223 (i.e., in the direction of arrow E) and therefore into alignment with the longitudinal axis 222 of the laser wire-processing device 200. FIG. 7D illustrates a resultant relatively smaller passageway 503' between the expanded elastomeric grommets 700. In at least one aspect, in addition to aligning the wire 120 with the longitudinal symmetry axis 223, the expanded elastomeric grommets 700' can also provide a gripping or clamping force on the wire 120 such that tension can be applied to the wire 120 (in a direction out of the aperture 204) to further straighten the wire 120.

Figure 7F:
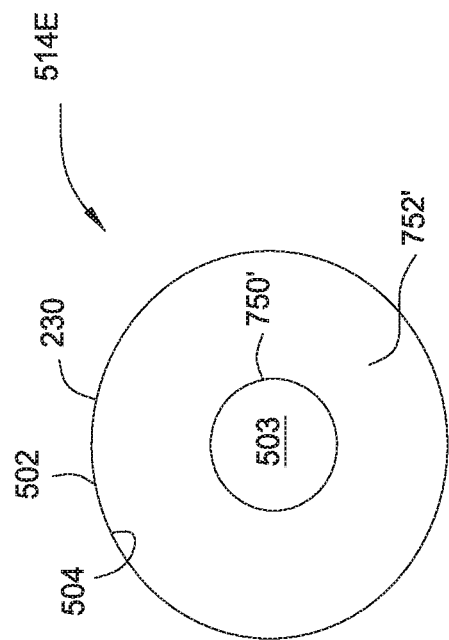
FIG. 7F is an end view of the wire guide of FIG. 7E showing the variation of the centering member in the wire guide in an expanded state.
Figure 7E:
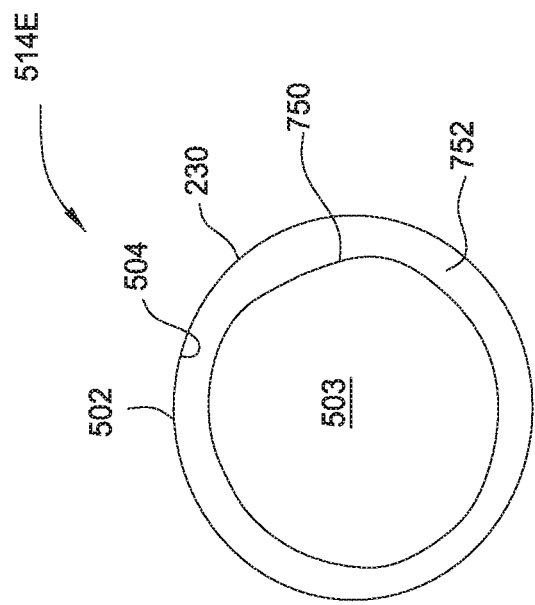
FIG. 7E is an end view of the wire guide of FIG. 7A showing a variation of the centering member in the wire guide in an unexpanded state.

FIGS. 7E and 7F are end views of another centering member 514E in which the multiple elastomeric grommets 700 illustrated in FIGS. 7C and 7D are replaced with a unitary elastomeric grommet 750 arranged around a periphery of the interior surface 504 of the passageway 503. FIG. 7E illustrates the grommet 750 in an unexpanded state toward the longitudinal symmetry axis 223 (i.e., an interior volume 752 of the unitary elastomeric grommet 750 is relatively small) such that the passageway 503 through the tube 230 is relatively large, which can enable the wire 120 to easily be inserted through the passageway 503. FIG. 7F illustrates the grommet 750 in an expanded state (indicated by the reference numerals 750' and 752') such that the passageway 503 is smaller. As the passageway 503 gets smaller, the wire 120 passing therethrough is urged toward the center of the tube 230 and alignment with the longitudinal symmetry axis 223. Additionally, as the unitary elastomeric grommet 750 expands to the shape shown in FIG. 7F, the unitary elastomeric grommet 750' could squeeze or clamp the wire 120, further holding the wire 120 in place in the tube 230.

A wire guide 240 that comprises the tubes 230 illustrated in FIGS. 7A-7F is suitable for use in the laser wire-processing devices 200 shown in FIGS. 1, 2, 3A, 3B, and 4A-4C.

Figure 8A:
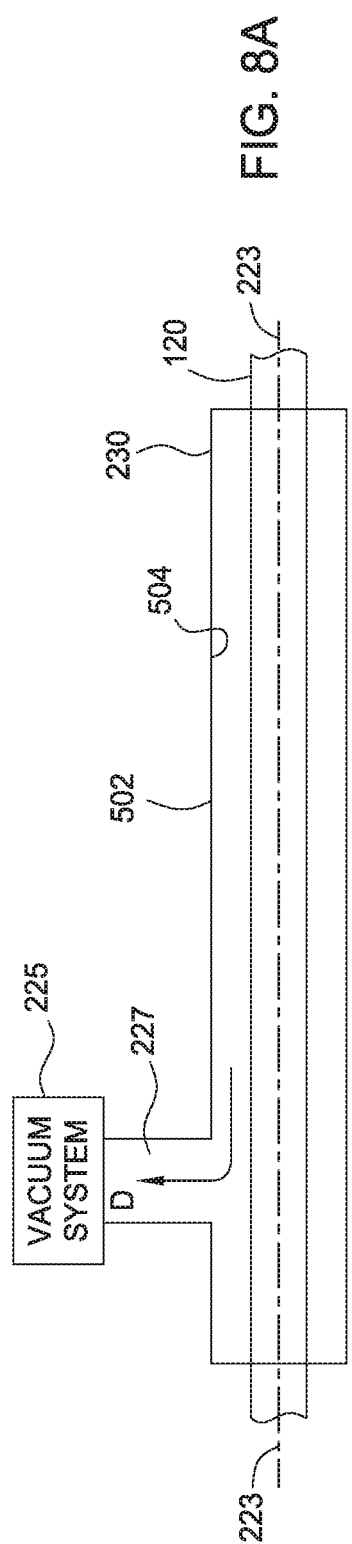
FIG. 8A is a cross-sectional side view of a wire guide according to one aspect for use with a laser wire-processing device, wherein a port in the wire guide communicates with a vacuum system.
Figure 8B:
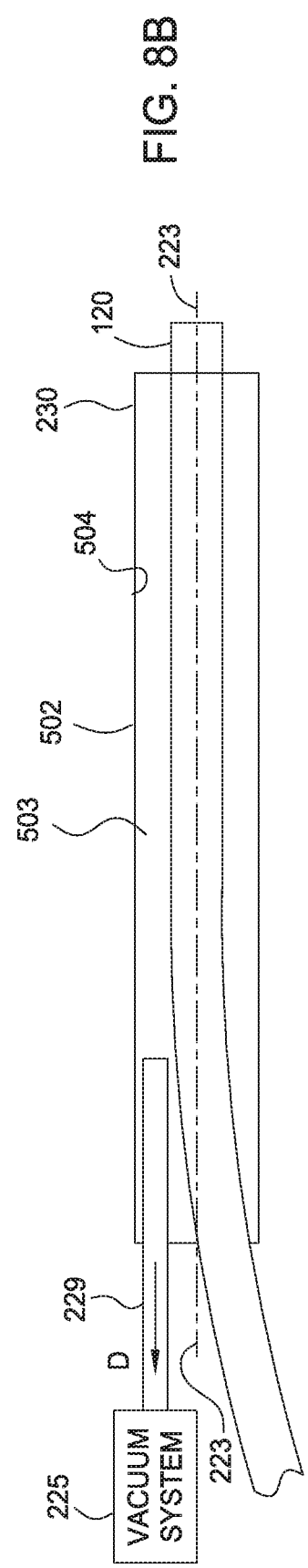
FIG. 8B is a cross-sectional side view of a wire guide according to one aspect for use with a laser wire-processing device, wherein a vacuum probe in communication with a vacuum system is inserted into a passageway of the wire guide.

In addition to expanding the elastomeric grommets 700 and 750, the vacuum can also displace debris and air from within the tube 230. The at least one laser beam 110 severing the insulation layer 124 of the wire 120 can generate smoke particles and heat. The vacuum can displace or otherwise remove any smoke particles from the tube 230. Additionally, the movement of air through the tube 230 caused by the vacuum can cool a portion of the wire 120 heated by the at least one laser beam 110. FIGS. 8A and 8B illustrate two possible arrangements to couple a vacuum system 225 that can provide such movement of air to the tube 230. FIG. 8A is a cross-sectional side view of a tube 230 that includes a port 227 that is in communication with the passageway 503. The port 227 could be a pipe or other tube arranged on the tube 230. The vacuum system 225 is coupled to the port 227. For example, the vacuum system 225 could be coupled to the port 227 via flexible tubing. In operation, when the vacuum system 225 is activated, the vacuum system 225 draws air from the passageway 503 of the tube 230 through the port 227 in the direction indicated by arrow D.

FIG. 8B is a cross-sectional side view of a tube 230 in which a vacuum probe 229 is inserted into the passageway 503 alongside the wire 120. A passageway through the vacuum probe 229 is in communication with the vacuum system 225. In operation, when the vacuum system 225 is activated, the vacuum system 225 draws air from the passageway of the tube 230 through the vacuum probe 229 in the direction of arrow D.

In various aspects, positive pressure (instead of a vacuum) could be used to displace debris and air from within the tube 230 and/or within the housing 202 of the laser wire-processing device 200. For example, the laser wire-processing device 200 could be provisioned with a fan or a pump in the housing 202 that draws air into the housing 202, resulting in an increased air pressure in the housing 202. The high-pressure air in the housing flows out through the aperture 204, carrying any debris within the housing 202.

Figure 9A:
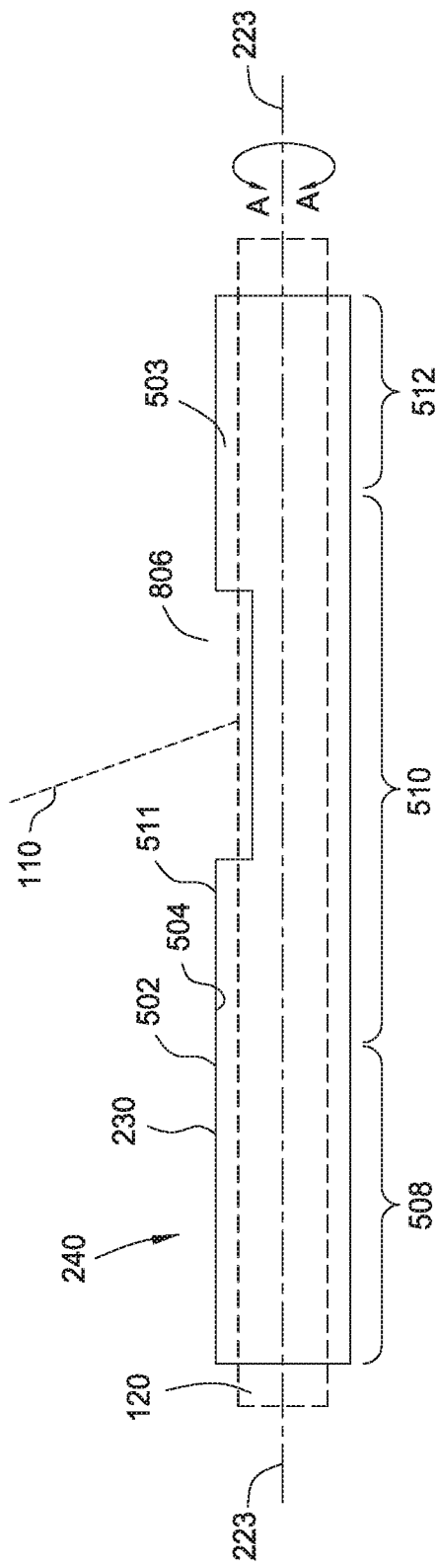
FIG. 9A is a side view of a tube according to one aspect for use with a laser wire processing device.

FIG. 9A is a cross-sectional side view of another variation of the tube 230 of the wire guide 240 illustrated in FIGS. 1, 2, 3A, 3B, 4A-4C, 5A-5D, 6A, 6B, and 7A-7F, according to one aspect, in which the tube is made of an opaque material, such as metal or plastic, or is coated in an opaque material that the laser beam 110 cannot pass through and the tube 230 includes a window 806 through which the laser beam 110 can reach the wire 120 in the passageway 503. In various aspects, the opaque material has a low emissivity such that portions of the laser beam(s) 110 that impinge upon the opaque material are substantially absorbed rather than reflected. In one aspect, the window 806 comprises an opening in the tube 230. In another aspect, the window 806 comprises a portion of the tube 230 that does not include an opaque coating. In this aspect, the tube 230 rotates in the direction of arrows A about the longitudinal axis 222 of the laser wire-processing device such that the window 806 remains aligned with a laser beam 110 as the laser beam 110 rotates about the longitudinal axis 222 to cut the insulation layer 122 of the wire 120. In aspects in which the laser wire-processing device includes more than one laser beam 110, the tube 230 could include multiple windows 806. For example, in aspects in which the laser wire-processing device 200 includes two laser beams 110 in the laser wire-processing device 200, the tube 230 includes two windows 806 on opposing sides of the tube 230. The tube 230 could be connected to the backstop 206 and/or the turret 212 to facilitate rotation. In various other aspects, the wire 120 could rotate within the tube 230 relative to the laser beams 110. As a result, the tube 230 and laser beams 110 would be stationary.

Figure 9B:
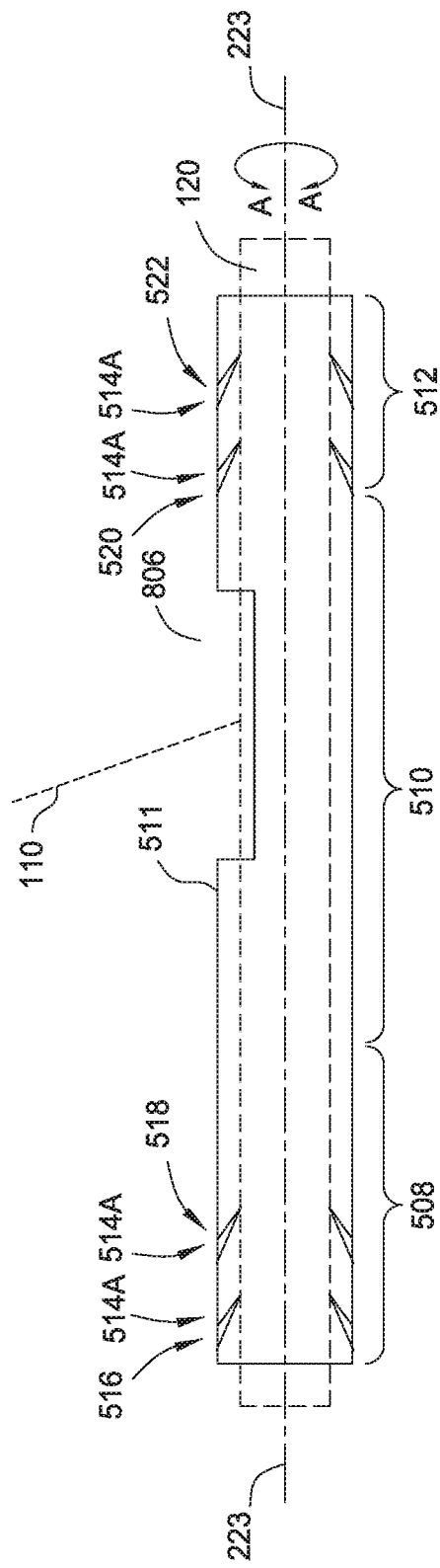
FIG. 9B is a side view of a tube according to one aspect for use with a laser wire processing device.

FIG. 9B is a cross-sectional side view of a variation of the tube 230 illustrated in FIG. 9A, in which the tube 230 includes the centering members 514A arranged in the passageway 503. Alternatively, the tube 230 illustrated in FIG. 9B could include the other centering members 514B, 514C, 514D, or 514E depicted in FIGS. 5-7 and discussed above.

As shown in FIGS. 9A and 9B, the laser access window 806 is arranged in the middle portions 510 of the tube 230. In various other aspects, the laser access window 806 could be arranged in the first end portion 508 or the second end portion 512. For example, in one aspect, the laser access window 806 could extend from an end of the tube 230 and through the second end portion 512 to the middle portion 510.

A wire guide 240 that comprises the tube 230 illustrated in FIG. 8 is suitable for use in any of the laser wire-processing devices 200 shown in FIGS. 1, 2, 3A, and 3B.

As discussed above, in certain aspects, clamps are added to the laser wire-processing device along the longitudinal axis. The clamps can grip a wire inserted into the laser wire-processing device. Thereafter, tension can be applied to the curved wire to straighten the wire along the longitudinal axis.

FIG. 10A-10B are cross-sectional side views of an aspect of a laser wire-processing device 200, wherein the wire guide 240 comprises one or more backstop guides 908 arranged on a backstop 902 of the laser wire-processing device 200 to urge the end 128 of the wire 120 into alignment with the longitudinal axis 222. The backstop guide(s) 908 are arranged on a surface 904 of the backstop 902 facing the aperture 204. The backstop guides 908 urge an end of the wire 120 inserted through the aperture 204 toward an intersection of the longitudinal axis 222 with the surface 904 of the backstop 902. In the aspect illustrated in FIGS. 10A-10B, the backstop guides 908 comprise inclined surfaces 909 extending toward the aperture 204 from the backstop 902. The inclined surfaces 909 extend further toward the aperture 204 at greater distance from the longitudinal axis 222. In the event a curved or bent wire 120 is inserted through the aperture 204, the end 128 of the wire 120 will encounter one of the inclined surfaces 909 of the backstop guides 908. The inclined surfaces 909 will urge the end 128 of the wire 120 toward the longitudinal axis 222. The backstop guides 908 extend sufficiently far away from the longitudinal axis 222 such that a bent or curved wire will impinge upon an inclined surface 909. In one aspect, the backstop guides 908 form an opening 905 therebetween, and the inclined surfaces 909 urge the end of the wire 120 toward and into the opening 905.

As shown in FIG. 10B, after the end of the wire 120 has been urged into the opening 905, the backstop guides 908 can be moved in the direction indicated by arrows C to a closed position (indicated by reference numerals 908') such that the opening 905' has a smaller dimension than the opening 905 shown in FIG. 10A, thereby securing the end 128 of the wire 120 in alignment with the longitudinal axis 222. Thereafter, tension can be applied to a portion of the wire 120 extending out of the aperture 204 such that the wire 120 within the housing 202 is taut and straight along the longitudinal axis 222. Thereafter, second clamps 404 arranged proximal to the aperture 204 in the housing 202 can be moved from an unclamped position (illustrated in FIG. 10A) to a clamped position (illustrated in FIG. 10B and indicated by reference numerals 404') to clamp the wire 120 and maintain the portion of the wire 120 between the backstop guides 908 and clamps 404' in tension and alignment with the longitudinal axis 222.

FIGS. 10C and 10D are cross-sectional side views of a variation of the laser wire-processing device 200 shown in FIGS. 10A and 10B, in which the wire guide 240 includes the backstop guides 908 and the tube 230, discussed above with reference to FIGS. 1-9. The tube 230 could be squeezed by the backstop guides 908 and the clamps 404 to hold both the tube 230 and the wire 120 in place and in alignment with the longitudinal axis 222.

Figure 11:
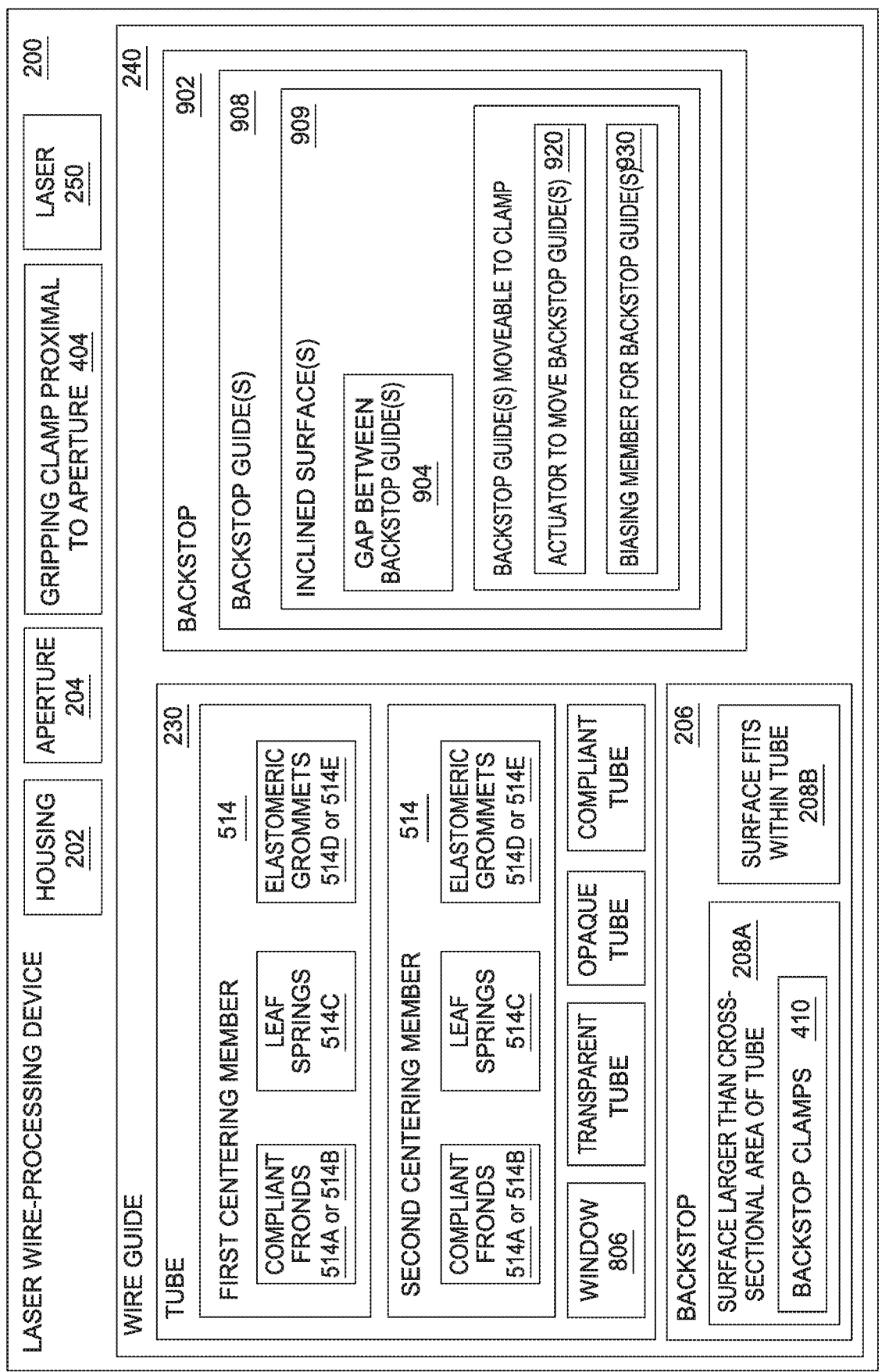
FIG. 11 is a block diagram that shows variations and combinations of the aspects shown in FIGS. 1, 2, 3A, 3B, 4A-4D, 5A, 5B, 6A-6D, 7, 8A-8C, and 9A-9D.

FIG. 11 is a block diagram illustrating at least some possible combinations of the various components described above with reference to FIGS. 1, 2, 3A, 3B, 4A-4C, 5A-5D, 6A, 6B, 7A-7F, 8A, 8B, 9A, 9B, and 10A-10D. A laser wire-processing device 200 includes a housing 202 and an aperture 204 arrange in the housing 202 to receive a wire 120. The laser wire-processing device 200 also includes a laser 250 that outputs a laser beam 110 to cut an insulation layer 122 of the wire 120.

The laser wire-processing device 200 also includes a wire guide 240 that directs or urges the wire 120 into alignment with the longitudinal axis 222 of the laser wire-processing device 200 such that the insulation layer 122 of the wire 120 can be properly cut by the laser beam 110.

In certain aspects, the wire guide 240 comprises a tube 230. The tube 230 can be sized such that a passageway formed therein is slightly larger than an outer diameter of the wire. FIGS. 4A-4C illustrate three exemplary tubes 230 having different interior passageway dimensions, and one of the tubes 230 with the smallest interior passageway dimension that is larger than an exterior diameter of the wire can be selected. In various aspects, the tube 230 can include a first centering member 514 arranged within the interior passageway at a first location along a longitudinal symmetry axis 223 of the tube 230. In addition, in various aspects, the tube 230 can include a second centering member 514 arranged within the interior passageway at a second location along the longitudinal symmetry axis 223. The centering member(s) urge the wire 120 toward the longitudinal symmetry axis 223 of the tube 230, which is aligned with the longitudinal axis 222 of the laser wire-processing device 200. The centering member(s) could comprise compliant fronds 514A or 514B arranged within the passageway, leaf springs 514C arranged within the passageway, and/or elastomeric grommets 514D or 514E arranged within the passageway.

In various aspects, the tube 230 can be transparent or opaque, and the first and second centering members 514 can be included in both the transparent and the opaque tubes 230. As used herein, the terms transparent and opaque are with respect to a wavelength (or wavelengths) of light of the laser beam 110. The tube 230 is transparent if the laser beam 110 passes through the tube 230. The tube 230 is opaque if the laser beam 110 does not pass through the tube 230. In at least one aspect, such as aspects in which the tube 230 is opaque, the tube 230 can include a laser-access window 806 through which the laser beam 110 can impinge upon the wire 120. In at least one aspect, the tube 230 can be rigid. In at least one other aspect, the tube 230 can be resilient and/or compliant. The first and second centering members 514 can be included in both the rigid tubes 230 and the resilient/compliant tubes 230.

The laser wire-processing device 200 includes a backstop 206 arranged therein that the wire 120 abuts, and the backstop 206 is movable relative to the laser beam 110 to adjust a length of the insulation layer 122 to be severed from the wire 120. In one aspect, the backstop 206A includes a wire-contact surface 208A facing the aperture 204 that has a surface area larger than a cross-sectional area of the tube 230. In certain aspects, the wire-contact surface 208A includes backstop clamps 410 that can clamp an end of a wire and/or an end of the tube 230. In other aspects, the backstop 206B includes a wire-contact surface 208B that fits within the passageway 503 in the tube 230.

In various aspects, the wire guide 240 comprises backstop guides 908 arranged on a backstop 902. In at least one aspect, the backstop guides 908 include inclined surfaces 909 that urge an end 128 of a wire 120 toward a location on the backstop 902 aligned with the aperture 204. In at least one aspect, the backstop guides 908 define a gap 905 therebetween that the end of the wire 120 fits into. In at least one aspect, the backstop guides 908 are movable to clamp the wire 120 between them. In such aspects, the backstop guides 908 could be connected to an actuator 920 to move the inclined surface(s) between a clamped position and an unclamped position. In at least one aspect, the backstop guides 908 can be connected to a biasing member 930, such as a spring or an elastomeric member, which biases the backstop guides 908 in a clamped position. In at least one aspect, the backstop guides 908 could be connected to both the actuator 920 and the biasing member 930 such that the actuator 920 moves the backstop guides 908 from a biased, clamped position or from a biased, unclamped position.

In at least one aspect, the laser wire-processing device 200 can also include a gripping clamp 404 arranged proximal to the aperture 204 that can grip a portion of the wire 120 proximal to the aperture 204. In particular, the gripping clamps 404 are most advantageous when used in combination with aspects that include the backstop clamps 410 on the backstop 206 or in combination with aspects that include the backstop guides 908 on the backstop 902.

In the aspects described herein, a wire that may have residual curvature after on spooling may be quickly inserted into a laser wire-processing device 200 in an aligned manner such that the laser wire-processing device 200 will cleanly sever an insulation layer 122 of the wire 120. FIGS. 12A and 12B are side views of the end of the wire 120 and a processed wire 120', respectively. The processed wire 120' includes a gap 126 in the insulation layer 122 caused by the laser beam(s) 110 burning, melting, and/or ablating the insulation layer 122. As shown in FIG. 12B, the insulation layer 122' toward the end 128 of the processed wire 120' has been completely severed from the insulation layer 122 on the remainder of the processed wire 120'. In various circumstances, the insulation layer 122' at the end 128 of the processed wire 120' may not be completely severed in the gap 126, but a sufficient amount of material of the insulation layer 122 in the gap 126 may be removed such that remaining insulation layer 122 material in the gap 126 can be mechanically severed (e.g., by the insulation layer 122' at the end 128 of the processed wire 120' being pulled off the conductor 124).

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to certain aspects, other and further aspects may be devised without departing from the basic scope thereof, and the scope thereof is determined by the claims that follow.

What is claimed is:

1. A laser wire-processing device (200), comprising:
 a housing (202);
 an aperture (204) in the housing, wherein a longitudinal axis (222) extends through the aperture;
 a wire guide (240) arranged in the housing to manipulate a wire inserted through the aperture into a cutting position along the longitudinal axis, wherein the wire guide comprises:
 a tube (230) extending into the housing from the aperture, the tube defining a passageway (503) and having a longitudinal symmetry axis (223) that is coaxial with the longitudinal axis; and
 a first centering member (514) arranged within the passageway and configured to urge the wire toward the longitudinal symmetry axis; and
 a laser (250) operable to cut an insulation layer (122) of the wire (120) while in the cutting position.

2. The laser wire-processing device (200) of claim 1, further comprising:
 a backstop (206B) arranged in the housing and aligned with the longitudinal axis, the backstop defining a wire-contact surface (208B) in a facing relationship with the aperture,
 wherein the backstop (206B) comprises a post defining the wire-contact surface (208B), the post (206B) being slidably positionable within the passageway of the tube (230).

3. The laser wire-processing device (200) of claim 1, wherein the tube (230) extends along the longitudinal axis (222) toward a backstop (206A, 206B), and
 wherein the first centering member (514) is arranged in the passageway (503) at a first location (516 or 518) along a longitudinal symmetry axis (223) of the tube.

4. The laser wire-processing device (200) of claim 3, wherein the tube (230) defines a first end portion (508) and a second end portion (512) along the longitudinal symmetry axis (223), and a middle portion (510) between the first end portion and the second end portion, wherein the middle portion defines a laser cutting region (511); and wherein the first location (516 or 518) of the first centering member (514) is in the first end portion.

5. The laser wire-processing device (200) of claim 4, wherein the tube (230) includes a laser-access window (806) arranged in the middle portion (510), and wherein the wire guide (240) further comprises a second centering member (514) arranged around an interior surface (504) of the passageway (503) of the tube (230) at a second location (520 or 522) along the longitudinal symmetry axis (223) in the second end portion (512), and wherein the second centering member urges the wire (120) in the passageway toward the longitudinal symmetry axis.

6. The laser wire-processing device (200) of claim 3, wherein the first centering member (514A or 514B) includes a first plurality of compliant fronds (515) on an interior surface (504) of the passageway (503), wherein the first plurality of compliant fronds extend from the interior surface toward the longitudinal symmetry axis (223).

7. The laser wire-processing device (200) of claim 6, wherein the compliant fronds (515) are individually attached to the interior surface (504) of the passageway (503).

8. The laser wire-processing device (200) of claim 6, wherein the first plurality of compliant fronds (515) extends from a unitary member arranged around the interior surface (504) of the passageway (503).

9. The laser wire-processing device (200) of claim 1,
wherein the tube (230) and the wire therein are rotatable about the longitudinal axis (222) to expose an outer periphery (125) of the insulation layer (122) to at least one laser beam (110).

10. The laser wire-processing device (200) of claim 1, further comprising:
a backstop (206A) arranged in the housing and aligned with the longitudinal axis, the backstop defining a wire-contact surface (208A) in a facing relationship with the aperture,
wherein the wire guide (240) further comprises a backstop guide (908) facing the aperture (204) and configured to urge an end of the wire (120) inserted through the aperture toward the longitudinal axis.

11. The laser wire-processing device (200) of claim 10, wherein the backstop guide (908) has an inclined surface (909) that tapers toward the longitudinal axis in a direction from the aperture toward the backstop.

12. The laser wire-processing device (200) of claim 11, wherein the backstop guide (908) includes an opening (905) at the longitudinal axis, and wherein the inclined surface (909) urges the end of the wire (120) into the opening,
wherein the backstop guide (908) comprises at least two backstop guides, and wherein at least one of the backstop guides is selectively movable between a clamped position toward the longitudinal axis (222) and an unclamped position away from the longitudinal axis such that a dimension of the opening (905) changes from a small dimension that is smaller than an exterior dimension of the wire (120) to a large dimension that is larger than the exterior dimension of the wire, and wherein the at least one of the two backstop guides is moved from the unclamped position to the clamped position after the end of the wire has been urged into the opening to grip the end of the wire.

13. The laser wire-processing device (200) of claim 10, further comprising an actuator (920) operable to move the backstop guide (908) between an unclamped position and a clamped position.

14. The laser wire-processing device (200) of claim 10, further comprising a biasing member (930) configured to urge the backstop guide (908) toward a clamped position.

15. The laser wire-processing device (200) of claim 10, wherein the wire (120) and the backstop guide (908) rotate about the longitudinal axis (222) to expose an outer periphery (125) of the insulation layer (122) of the wire to at least one laser beam (110).

16. The laser wire-processing device (200) of claim 10, further comprising a gripping clamp (404) arranged proximate to the aperture (204), wherein the gripping clamp is operable to grip the wire (120) at a location along the longitudinal axis (222) proximate to the aperture after the backstop guide (908) is moved to a clamped position, and wherein the backstop (902) and backstop guide are movable away from the aperture after the gripping clamp grips the wire to tension the wire.

* * * * *